US012382374B2

United States Patent
Ho et al.

(10) Patent No.: US 12,382,374 B2
(45) Date of Patent: Aug. 5, 2025

(54) IMPROVING UPLINK PERFORMANCE AVOIDING PARAMETER CONFLICTS IN A WIRELESS NETWORK

(71) Applicant: Telefonaktiebolaget LM Ericsson (publ), Stockholm (SE)

(72) Inventors: Mitchell Ho, Sydney (AU); Philipp Frank, Madrid (ES); Chin Lam Eng, Tokyo (JP); Jaime Rodriguez Membrive, Malaga (ES); Bhavika Reddy Jalli, Acton, MA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 451 days.

(21) Appl. No.: 17/796,030

(22) PCT Filed: Feb. 24, 2021

(86) PCT No.: PCT/EP2021/054505
§ 371 (c)(1),
(2) Date: Jul. 28, 2022

(87) PCT Pub. No.: WO2021/170617
PCT Pub. Date: Sep. 2, 2021

(65) Prior Publication Data
US 2023/0075810 A1    Mar. 9, 2023

Related U.S. Application Data

(60) Provisional application No. 62/980,578, filed on Feb. 24, 2020.

(51) Int. Cl.
*H04W 48/16*    (2009.01)
*H04W 28/18*    (2009.01)
(Continued)

(52) U.S. Cl.
CPC .......... *H04W 48/16* (2013.01); *H04W 28/18* (2013.01); *H04W 72/0453* (2013.01); *H04W 72/23* (2023.01); *H04W 72/542* (2023.01)

(58) Field of Classification Search
CPC . H04W 48/16; H04W 28/18; H04W 72/0453; H04W 72/23; H04W 72/542; H04W 24/04; H04W 24/02
See application file for complete search history.

(56) References Cited

U.S. PATENT DOCUMENTS

| 9,392,471 | B1 | 7/2016 | Thomas et al. | |
| 2011/0092195 | A1* | 4/2011 | Hussein | H04W 24/02 455/418 |

(Continued)

FOREIGN PATENT DOCUMENTS

| EP | 2882137 A1 | 6/2015 |
| WO | 2019233635 A1 | 12/2019 |
| WO | 2020164739 A1 | 8/2020 |

OTHER PUBLICATIONS

Cheng, Heng-Tze, "Wide & Deep Learning for Recommender Systems", https://arxiv.org/pdf/1606.07792.pdf, Jun. 24, 2016, pp. 1-4.

(Continued)

*Primary Examiner* — Chuong M Nguyen
(74) *Attorney, Agent, or Firm* — Murphy, Bilak & Homiller, PLLC

(57) ABSTRACT

The invention refers to a method performed by a performance recommender for a wireless network, obtaining (2010) for a plurality of cells input data, the input data comprising actual cell configuration parameter values; applying (2030) a machine-learning model to the input data to generate, for at least a portion of the cells, one or more recommendations for changes to the cell configuration parameter values to improve uplink, UL, performance in the respective cells; and based on identifying conflicts between recommendations for different cells, partitioning (2040) the plurality of cells into a plurality of interaction areas of neighboring cells; resolving (2050) conflicts in recommendations for respective cells within each of the interaction areas and across different interaction areas; and for at least a portion of the cells, determining (2060) preferred values for the cell configuration parameters to improve UL performance in the respective cells; the invention further relates to a corresponding performance recommender and a corresponding computer program.

20 Claims, 24 Drawing Sheets

(51) Int. Cl.
*H04W 72/0453* (2023.01)
*H04W 72/23* (2023.01)
*H04W 72/542* (2023.01)

(56) References Cited

U.S. PATENT DOCUMENTS

| | | |
|---|---|---|
| 2017/0250866 A1* | 8/2017 | Brito ................. H04L 41/22 |
| 2017/0272970 A1* | 9/2017 | Mendo Mateo .. H04W 28/0236 |
| 2019/0205939 A1* | 7/2019 | Lal ..................... G06N 3/045 |
| 2019/0278922 A1* | 9/2019 | Levin ................ G06F 21/604 |
| 2022/0126864 A1* | 4/2022 | Moustafa ............... H04W 4/46 |
| 2022/0240106 A1* | 7/2022 | Wang ................. G06N 3/045 |

OTHER PUBLICATIONS

Covington, Paul, et al., "Deep Neural Networks for YouTube Recommendations", RecSys '16, Boston, MA, https://storage.googleapis.com/pub-tools-public-publication-data/pdf/45530.pdf, Sep. 15-19, 2016, pp. 1-8.

Lateef, Hafiz Yasar, et al., "LTE-Advanced Self-Organizing Network Conflicts and Coordination Algorithms", IEEE Wireless Communications, Jun. 2015, pp. 108-117.

Rojas, Diego Fernando Preciado, et al., "Machine Learning-based SON function conflict resolution", 2019 EEE Symposium on Computers and Communications (ISCC), 2019, pp. 1-6.

Kue, Hong-Jian, et al., "Deep Matrix Factorization Models for Recommender Systems", Proceedings of the Twenty-Sixth International Joint Conference on Artificial Intelligence (IJCAI-17), https://www.ijcai.org/proceedings/2017/0447.pdf, 2017, pp. 3203-3209.

* cited by examiner

FIG. 7
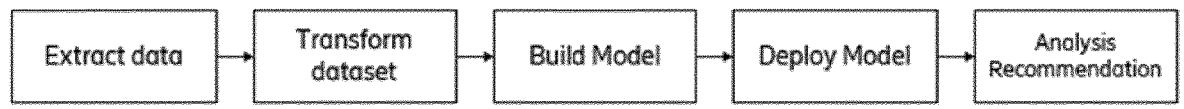
FIG. 8
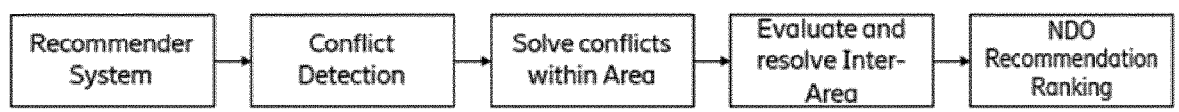
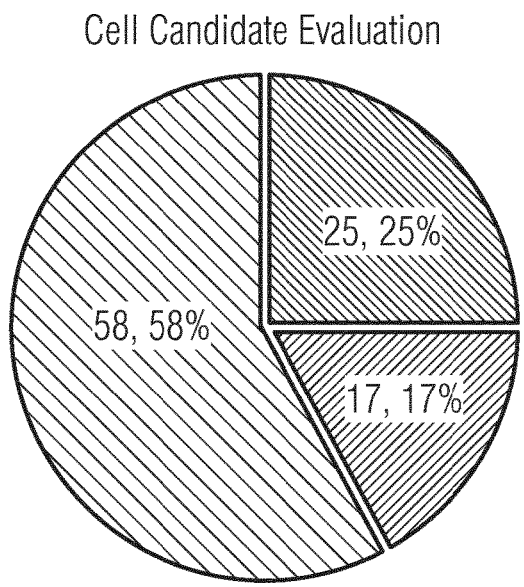
FIG. 9
Cell Candidate Evaluation
- Tuning pzero / alpha for CID issue cell
- Tuning pzero / alpha for neighbor cell
- No better configuration found

```
pZeroNominalPusch  alpha
-113                 10      15
-109                 10       6
-103                 10  114642
-101                 10      19
-100                 10     237
 -99                 10      21
 -98                 10     201
 -97                 10      33
 -96                 10     299
 -95                 10      31
 -93                 10       4
 -90                 10       3
dtype: int64
```

FIG. 14

| Top_1_Class_ul_interfece | pZeroNominalPusch | alpha | count | r2 | evar_score | mae | mse | max_err | mean_err | >5% | >10% | >20% | >30% |
|---|---|---|---|---|---|---|---|---|---|---|---|---|---|
| 0.0 | 0 | 2 | 150.0 | 0.837 | 0.848 | 0.025 | 0.001 | 0.190 | 0.010 | 0.100 | 0.033 | 0.000 | 0.0 |
| | 4 | 1 | 150.0 | 0.952 | 0.958 | 0.027 | 0.001 | 0.132 | 0.012 | 0.127 | 0.007 | 0.000 | 0.0 |
| | 6 | 1 | 135.0 | 0.919 | 0.923 | 0.029 | 0.001 | 0.096 | 0.008 | 0.133 | 0.007 | 0.000 | 0.0 |
| | 7 | 0 | 63.0 | 0.957 | 0.970 | 0.026 | 0.001 | 0.089 | 0.018 | 0.111 | 0.000 | 0.000 | 0.0 |
| 1.0 | 4 | 1 | 84.0 | 0.932 | 0.942 | 0.026 | 0.002 | 0.201 | 0.016 | 0.119 | 0.048 | 0.012 | 0.0 |
| 3.0 | 4 | 1 | 150.0 | 0.806 | 0.821 | 0.032 | 0.002 | 0.120 | 0.012 | 0.173 | 0.040 | 0.000 | 0.0 |
| 7.0 | 0 | 2 | 150.0 | 0.722 | 0.756 | 0.024 | 0.001 | 0.100 | 0.012 | 0.093 | 0.007 | 0.007 | 0.0 |
| | 4 | 1 | 150.0 | 0.910 | 0.933 | 0.024 | 0.001 | 0.212 | 0.018 | 0.087 | 0.020 | 0.007 | 0.0 |
| 11.0 | 4 | 1 | 150.0 | 0.954 | 0.956 | 0.028 | 0.002 | 0.089 | 0.010 | 0.187 | 0.020 | 0.000 | 0.0 |

FIG. 15

| | object | Top_config_1 | Top_config_2 | Top_config_3 | Top_pred_1 | Top_pred_2 | Top_pred_3 | present_configuration | top_diff |
|---|---|---|---|---|---|---|---|---|---|
| 0 | 44020-32774-3 | [2.0, 1.0] | [7.0, 1.0] | [0.0, 1.0] | 1.552467 | 1.546630 | 1.544904 | ['2.0', '2.0'] | 0.228251 |
| 1 | 44020-32785-3 | [2.0, 0.0] | [3.0, 0.0] | [2.0, 1.0] | 1.837109 | 1.793955 | 1.754089 | ['2.0', '2.0'] | 0.609851 |
| 7 | 44020-32908-1 | [2.0, 1.0] | [7.0, 1.0] | [0.0, 1.0] | 1.636827 | 1.634576 | 1.634338 | ['2.0', '2.0'] | 0.233132 |
| 8 | 44020-32908-1 | [2.0, 1.0] | [7.0, 1.0] | [0.0, 1.0] | 1.636827 | 1.634576 | 1.634338 | ['2.0', '2.0'] | 0.233132 |
| 9 | 44020-32908-1 | [2.0, 1.0] | [7.0, 1.0] | [0.0, 1.0] | 1.636827 | 1.634576 | 1.634338 | ['2.0', '2.0'] | 0.233132 |
| 10 | 44020-32908-3 | [2.0, 1.0] | [2.0, 0.0] | [3.0, 0.0] | 1.890362 | 1.878599 | 1.871511 | ['2.0', '2.0'] | 0.538698 |
| 12 | 44020-32993-2 | [2.0, 1.0] | [0.0, 0.0] | [3.0, 0.0] | 1.862603 | 1.860368 | 1.859341 | ['2.0', '2.0'] | 0.284489 |
| 13 | 44020-32993-2 | [2.0, 1.0] | [0.0, 0.0] | [3.0, 0.0] | 1.862603 | 1.860368 | 1.859341 | ['2.0', '2.0'] | 0.284489 |
| 14 | 44020-33042-2 | [2.0, 0.0] | [3.0, 0.0] | [2.0, 1.0] | 1.920540 | 1.917564 | 1.916577 | ['2.0', '2.0'] | 0.337572 |
| 15 | 44020-33042-2 | [2.0, 0.0] | [3.0, 0.0] | [2.0, 1.0] | 1.920540 | 1.917564 | 1.916577 | ['2.0', '2.0'] | 0.337572 |

FIG. 17

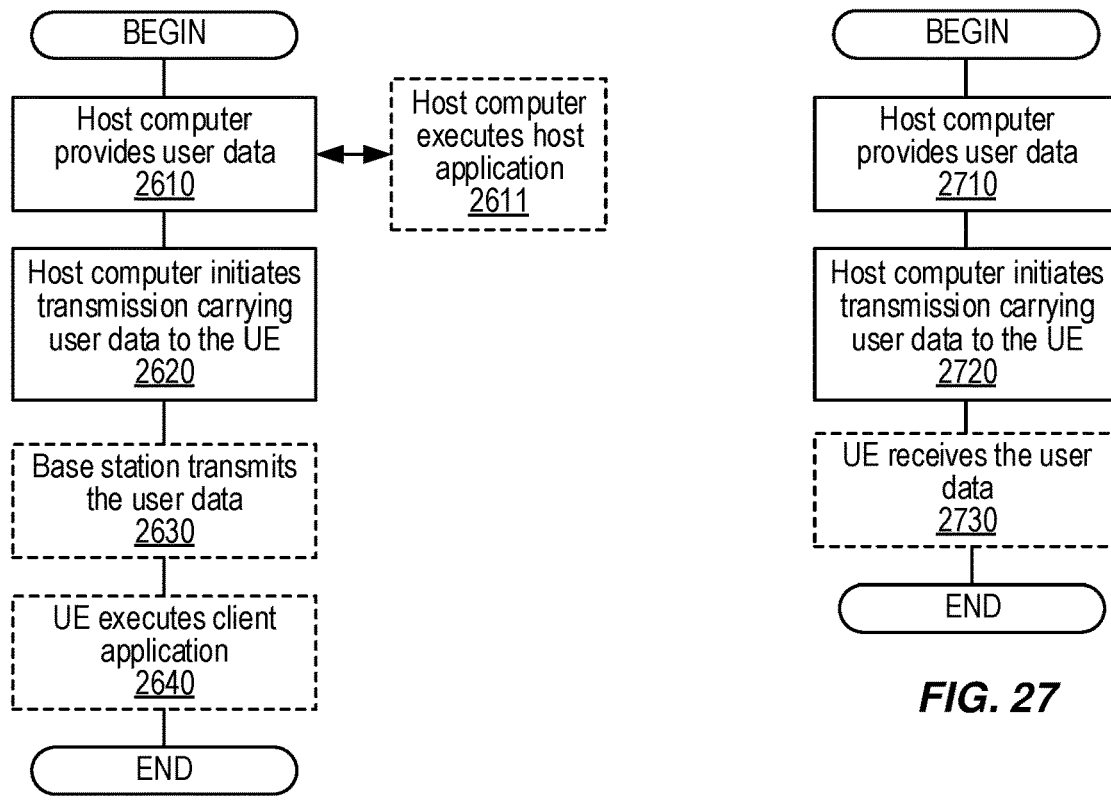
FIG. 26
FIG. 27
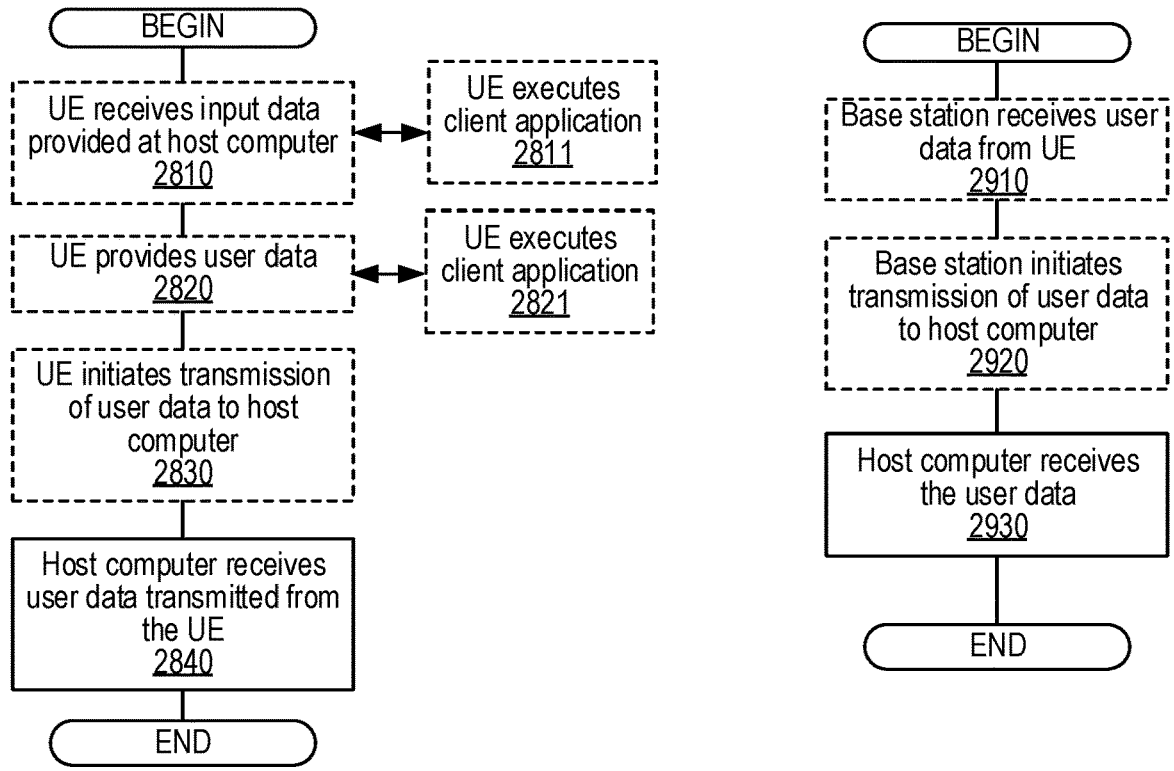
FIG. 28
FIG. 29

IMPROVING UPLINK PERFORMANCE AVOIDING PARAMETER CONFLICTS IN A WIRELESS NETWORK

TECHNICAL FIELD

The present invention generally relates to wireless communication networks, and particularly relates to machine learning (MIL) and/or artificial intelligence (AI) techniques for recommending changes in configuration of wireless networks to improve uplink (e.g., device to base station) performance.

BACKGROUND

Long Term Evolution (LTE) is an umbrella term for so-called fourth-generation (4G) radio access technologies developed within 3GPP and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

3GPP LTE Rel-10 supports bandwidths larger than 20 MHz. One important Rel-10 requirement is backward compatibility with Rel-8, including spectrum compatibility. As such, a wideband LTE Rel-10 carrier (e.g., wider than 20 MHz) appears as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. One of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel. Furthermore, LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols.

FIG. 2B illustrates a block diagram of an exemplary Control (C)-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel on PDCCH for pages from the EPC via eNB. A UE in RRC_IDLE state is known in the EPC and has an assigned IP address, but is not known to the serving eNB (e.g., there is no stored context).

Logical channel communications between a UE and an eNB is via radio bearers. Since LTE Rel-8, signaling radio bearers (SRBs) SRB0, SRB1, and SRB2 have been available for the transport of RRC and NAS messages. SRB0 is used for RRC connection setup, RRC connection resume, and RRC connection re-establishment. Once any of these operations has succeeded, SRB1 is then used for handling RRC messages (which may include a piggybacked NAS message) and for NAS messages prior to establishment of SRB2. SRB2 is used for NAS messages and lower-priority RRC messages (e.g., logged measurement information). SRB0 and SRB1 are also used for establishment and modification of data radio bearers (DRBs) for carrying user data between the UE and eNB.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3 shows an exemplary LTE FDD downlink (DL) radio frame with a fixed duration of 10 ms and consisting of 20 slots (labeled 0 through 19), each with a fixed duration of 0.5 ms. A 1-ms subframe comprises two consecutive slots where subframe i consists of slots 2i and 2i+1. Each exemplary DL slot consists of $N^{DL}_{symb}$ OFDM symbols, each of which is comprised of Ns, OFDM subcarriers. Exemplary values of $N^{DL}_{symb}$ can be 7 (with a normal CP) or 6 (with an extended-length CP) for subcarrier spacing (SCS) of 15 kHz. The value of Ns, is configurable based upon the available channel bandwidth. Since persons of ordinary skill in the art are familiar with the principles of OFDM, further details are omitted in this description. An exemplary uplink slot can be configured in similar manner as discussed above, but comprising $N^{UL}_{symb}$ OFDM symbols, each of which includes $N_{sc}$ subcarriers.

A combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ subcarriers over the duration of a slot (i.e., $N^{DL}_{symb}$ symbols), where $N^{RB}_{sc}$ is typically either 12 (with a 15-kHz SCS) or 24 (7.5-kHz SCS). The configuration of 15-kHz SCS and "normal" CP is often referred to as a numerology, p.

In general, an LTE physical channel corresponds to a set of REs carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals (e.g., channel state information reference signals, CSI-RS), synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI) including scheduling information for DL messages on PDSCH, grants for UL transmission on PUSCH, and channel quality feedback (e.g., CSI) for the UL channel. PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PUSCH is the uplink counterpart to the PDSCH. PUCCH is used by UEs to transmit uplink control information (UCI) including HARQ feedback for eNB DL transmissions, channel quality feedback (e.g., CSI) for the DL channel, scheduling requests (SRs), etc. PRACH is used for random access preamble transmission.

Within the LTE DL, certain REs within each LTE subframe are reserved for the transmission of reference signals, such as DM-RS mentioned above. Other DL reference signals include cell-specific reference signals (CRS), positioning reference signals (PRS), and CSI reference signals (CSI-RS). UL reference signals include DM-RS as well as sounding reference signals (SRS). Other RS-like DL signals include Primary Synchronization Sequence (PSS) and Secondary Synchronization Sequence (SSS), which facilitate the UEs time and frequency synchronization and acquisition of system parameters (e.g., via PBCH).

In LTE, UL and DL data transmissions (e.g., on PUSCH and PDSCH, respectively) can take place with or without an explicit grant or assignment of resources by the network (e.g., eNB). In general, UL transmissions are usually referred to as being "granted" by the network (i.e., "UL grant"), while DL transmissions are usually referred to as taking place on resources that are "assigned" by the network (i.e., "DL assignment").

In case of a transmission based on an explicit grant/assignment, downlink control information (DCI) is sent to the UE informing it of specific radio resources to be used for the transmission. In contrast, a transmission without an explicit grant/assignment is typically configured to occur with a defined periodicity. Given a periodic and/or recurring UL grant and/or DL assignment, the UE can then initiate a data transmission and/or receive data according to a predefined configuration. Such transmissions can be referred to as semi-persistent scheduling (SPS), configured grant (CG), or grant-free transmissions.

To meet end-user expectations and requirements, LTE networks must provide satisfactory performance in both UL and DL. However, end-user experience in most if not all LTE networks is primarily driven by UL performance. In other words, even if network DL performance can be improved, overall end-user experience will suffer if UL performance is unsatisfactory. Degradation of UL performance can be due to various root causes, such as base station hardware, user traffic conditions, interference from internal or external sources (e.g., neighboring base stations), and interactions with neighboring cells.

Optimization and tuning of LTE UL performance is conventionally based on network performance statistics (e.g., key performance indicators or KPIs), network configuration, radio frequency (RF) environment, and limits of eNB hardware. Current methods for analyzing these items and making recommendations for UL performance improvements typically apply basic rules, heuristics, and/or predetermined thresholds, and are generally limited to configurations or settings that have previously been validated within the network. However, such techniques can be inadequate when network conditions and/or configurations change to any substantial degree.

SUMMARY

Embodiments of the present disclosure provide specific improvements to techniques for identifying performance issues in cells of a wireless network and recommending configuration changes to improvement performance in such cells, such as by solutions to overcome the exemplary problems summarized above and described in more detail below Some exemplary embodiments include methods (e.g., procedures) performed by an uplink (UL) performance recommender system or function (performance recommender) for a wireless network (e.g. LTE E-UTRAN). The UL performance recommender system can be implemented by processing and/or communication resources provided by one or more nodes, e.g., in a wireless network or in a cloud-computing infrastructure associated with the wireless network.

These exemplary methods can include obtaining input data for each of a plurality of cells in the wireless network. For each cell, the input data may include (first) time-series data representing a plurality of key performance indicators (KPIs) at a (first) plurality of time points, current values for one or more cell configuration parameters, and/or root cause identity of a performance issue associated with the cell. In some embodiments, these exemplary methods can also include, for each particular cell, associating the input data for the particular cell with the input data for one or more neighbor cells that interact with the particular cell. For example, the one or more neighbor cells that interact with the particular cell can be selected based on input data relating to handover attempts between the respective cells.

These exemplary methods can also include applying a machine-learning model to the input data to generate, for at least a portion of the cells, one or more recommendations for changes to the cell configuration parameter values to improve UL performance in the respective cells. In some embodiments, the machine-learning model can include a deep matrix factorization model. These exemplary methods can also include, based on identifying conflicts between recommendations for different cells, partitioning the plurality of cells into a plurality of interaction areas of neighboring cells.

These exemplary methods can also include resolving conflicts in recommendations for respective cells within each of the interaction areas and across different interaction areas. These exemplary methods can also include, for at least a portion of the cells, determining preferred values for the cell configuration parameters to improve UL performance in the respective cells.

In some embodiments, applying the machine-learning model can include, for each particular cell, performing a random sampling of the configuration parameters for the particular cell and the one or more neighbor cells, to produce a more uniform distribution of the values of the configuration parameters; and creating the machine-learning model based on the more uniform distribution of values of the configuration parameters for the plurality of cells.

In some embodiments, applying the machine-learning model can also include generating candidate recommendations for changes to cell configuration parameters for the plurality of cells, and selecting, as the one or more recommendations for the at least a portion of the cells, the candidate recommendations that are associated with UL performance improvements greater than a threshold.

In some embodiments, the partitioning operations can also include identifying the conflicts between recommendations for different cells. For example, the UL performance recommender system can identify a first recommendation comprising changed values of the cell configuration parameters for a first cell and current values of the cell configuration parameters for a neighbor cell to the first cell, and a second recommendation comprising changed values of the cell configuration parameters for the neighbor cell and current values of the cell configuration parameters for the first cell. In such case, there will be an identified conflict between the two recommendations due to the different parameter values recommended for the same cell. In such embodiments, the partitioning operations can also include grouping the first cell and the neighbor cell into a first interaction area.

In some embodiments, the resolving conflicts operations can include determining which of the first and second recommendations (e.g. for the first interaction area) will provide the greatest expected performance improvement for the first cell and the neighbor cell, and selecting the determined recommendation as the recommendation for the first interaction area.

In some embodiments, the first interaction area can overlap with a second interaction area by one or more common cells. In such embodiments, for at least one of the common cells, the recommendation for the second interaction area can conflict with the recommendation for the first interaction area. In such embodiments, the resolving conflicts operations can also include determining which of the recommendations for the first and second interaction areas will provide the greatest expected performance improvement for the first and second interaction areas, and selecting the determined recommendation as the recommendation for the first and second interaction areas.

In various embodiments, the cell configuration parameters (e.g., for which values are obtained in the input data) can include target UL received power level on PUSCH (pZeroNominalPUSCH) and/or fractional power control setting (alpha). Various KPIs can be included in the input data, as described in more detail herein.

Other exemplary embodiments include UL performance recommender systems and performance-monitoring nodes in the wireless network that are configured to perform operations (e.g., using processing circuitry) corresponding to any of the exemplary methods described herein. Other exemplary embodiments include non-transitory, computer-readable media storing program instructions that, when executed by processing circuitry associated with an UL performance recommender system, configure such UL performance recommender systems to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 7 shows a flow diagram of a procedure for creation and deployment of an UL performance recommender model, according to various exemplary embodiments of the present disclosure.

FIG. 8 shows a flow diagram of a procedure for creation and deployment of a network diagnostic and optimization (NDO) logic system that can be used with the UL performance recommender model shown in FIG. 7, according to various exemplary embodiments of the present disclosure.

FIGS. 9-10 show exemplary outputs of an embodiment of the NDO logic system for evaluating UL performance recommendations.

FIG. 14 illustrates a distribution of network configurations when considering neighbor interaction based on random sampling, according to various exemplary embodiments of the present disclosure.

FIG. 15 illustrates a subset of the results of applying an UL performance recommender model on a previously unseen dataset.

FIG. 17 illustrates an example output of the UL performance recommender system after analysis.

FIGS. 26-29 are flow diagrams illustrating various exemplary methods implemented in a communication system, according to various exemplary embodiments of the present disclosure.

DETAILED DESCRIPTION

Figure 1:
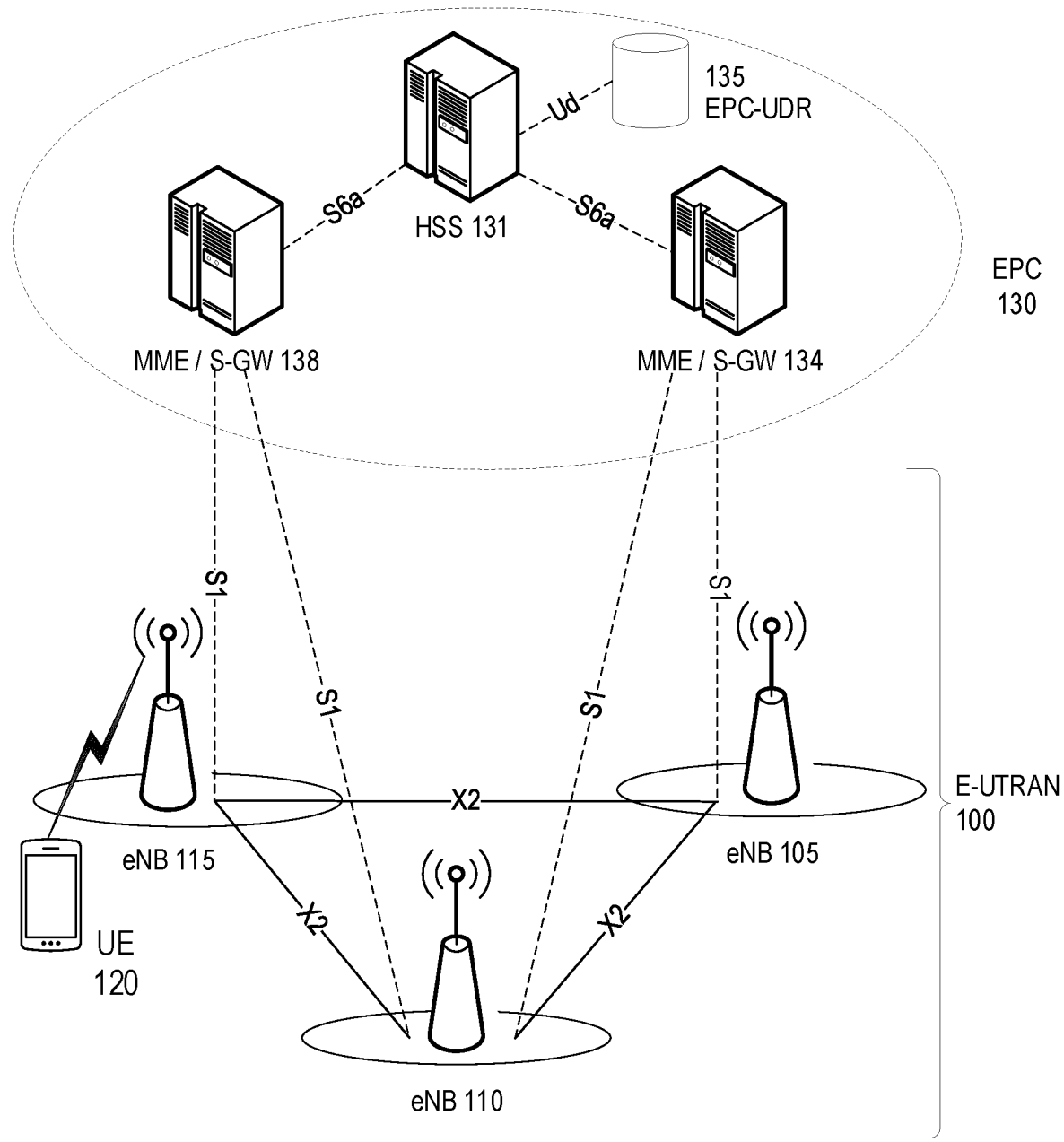
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
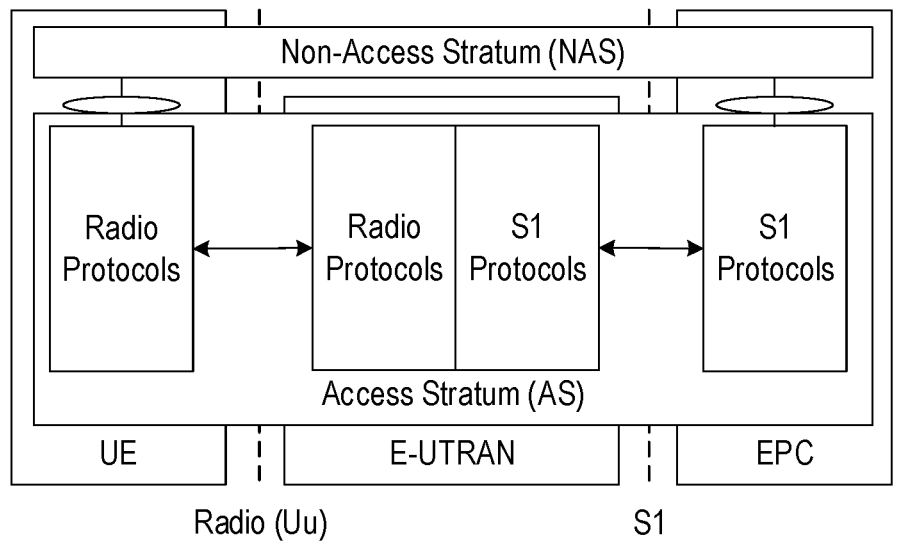
FIG. 2A is a high-level block diagram of an exemplary E-UTRAN architecture in terms of its constituent components, protocols, and interfaces.
Figure 2B:
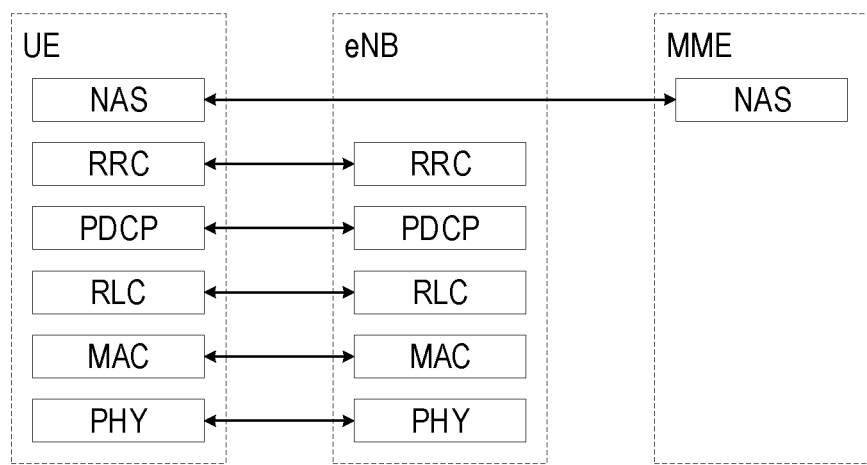
FIG. 2B is a block diagram of exemplary protocol layers of the control-plane portion of the radio (Uu) interface between a user equipment (UE) and the E-UTRAN.
Figure 3:
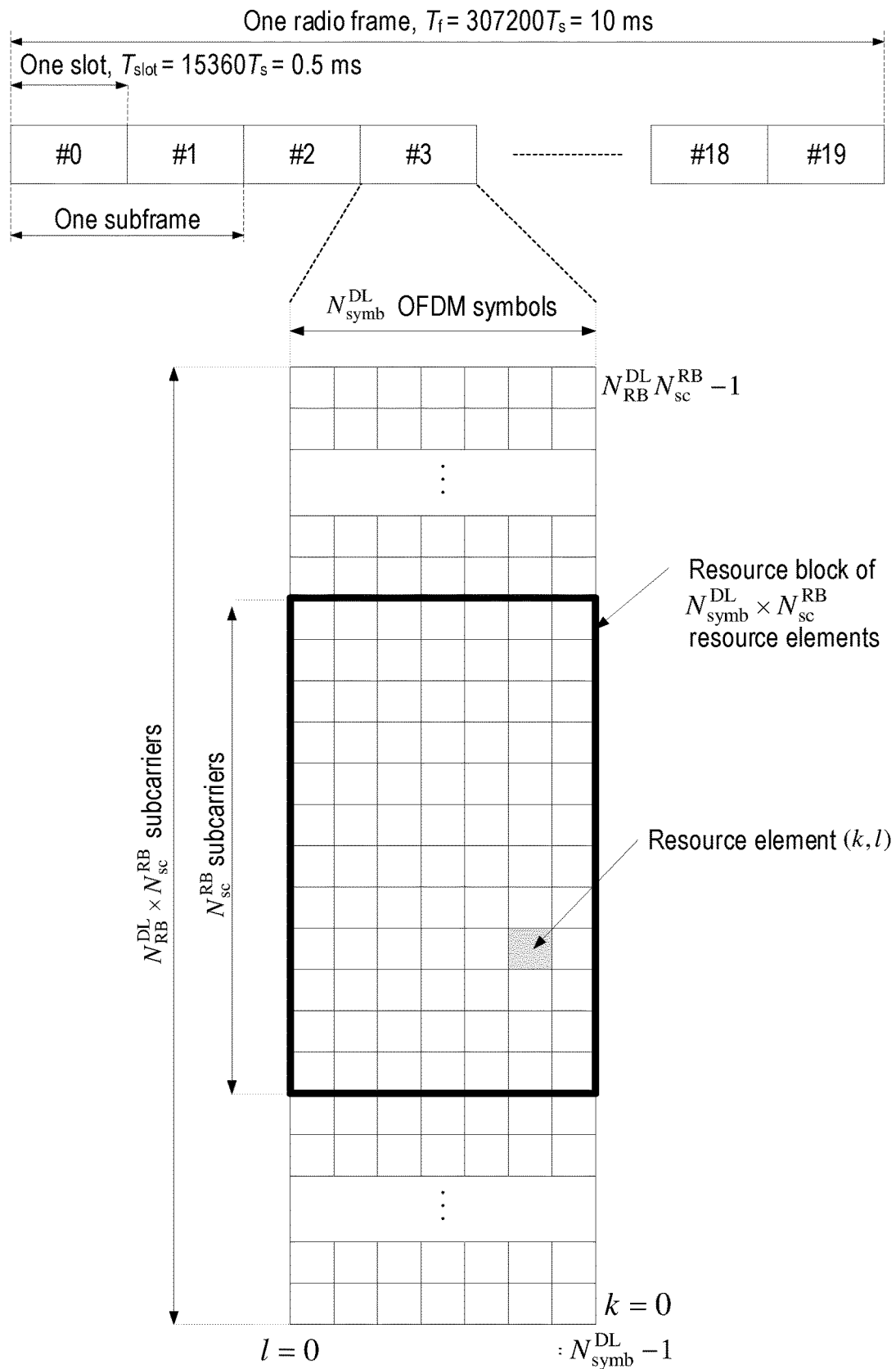
FIG. 3 is a block diagram of an exemplary downlink LTE radio frame structures used for frequency division duplexing (FDD) operation.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are given by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise.

Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, LTE networks are limited by uplink (UL) performance. Optimization and tuning of LTE UL performance is conventionally based on network performance statistics (e.g., KPIs), network configuration, RF environment (including interference), and limits of eNB hardware. Current methods for analyzing these items and making recommendations for UL performance improvements typically apply basic rules, heuristics, and/or predetermined thresholds, and are generally limited to configurations or settings that have previously been validated within the network.

In particular, current techniques for optimizing and/or tuning LTE UL performance can have the following issues, problems, and/or difficulties:

Several rule-based mechanisms are often needed to determine the RF environment and impacted statistics, which increases complexity.

Recommendations are limited based on knowledge and experience from own network, where there may be limited experience with and/or exposure to certain conditions and/or configurations.

Often require manual analysis of large amounts of additional metrics, which is not time-efficient and is subject to knowledge and experience of individual personnel, which is not scalable and can result in inconsistencies.

Limited configurations used in own network make it difficult to accurately estimate possible improvement or degradation without trial deployments.

If trial deployments are used to generate performance improvement recommendations, trials of multiple configurations may be needed, which consume resources and time needed for planning, implementation, observation, and evaluation.

Even if such recommendations can be generated, their applicability is limited to similar scenarios. Moreover, "similar scenarios" are determined based on experience of individual personnel, which can also result in inconsistencies.

Figure 4:
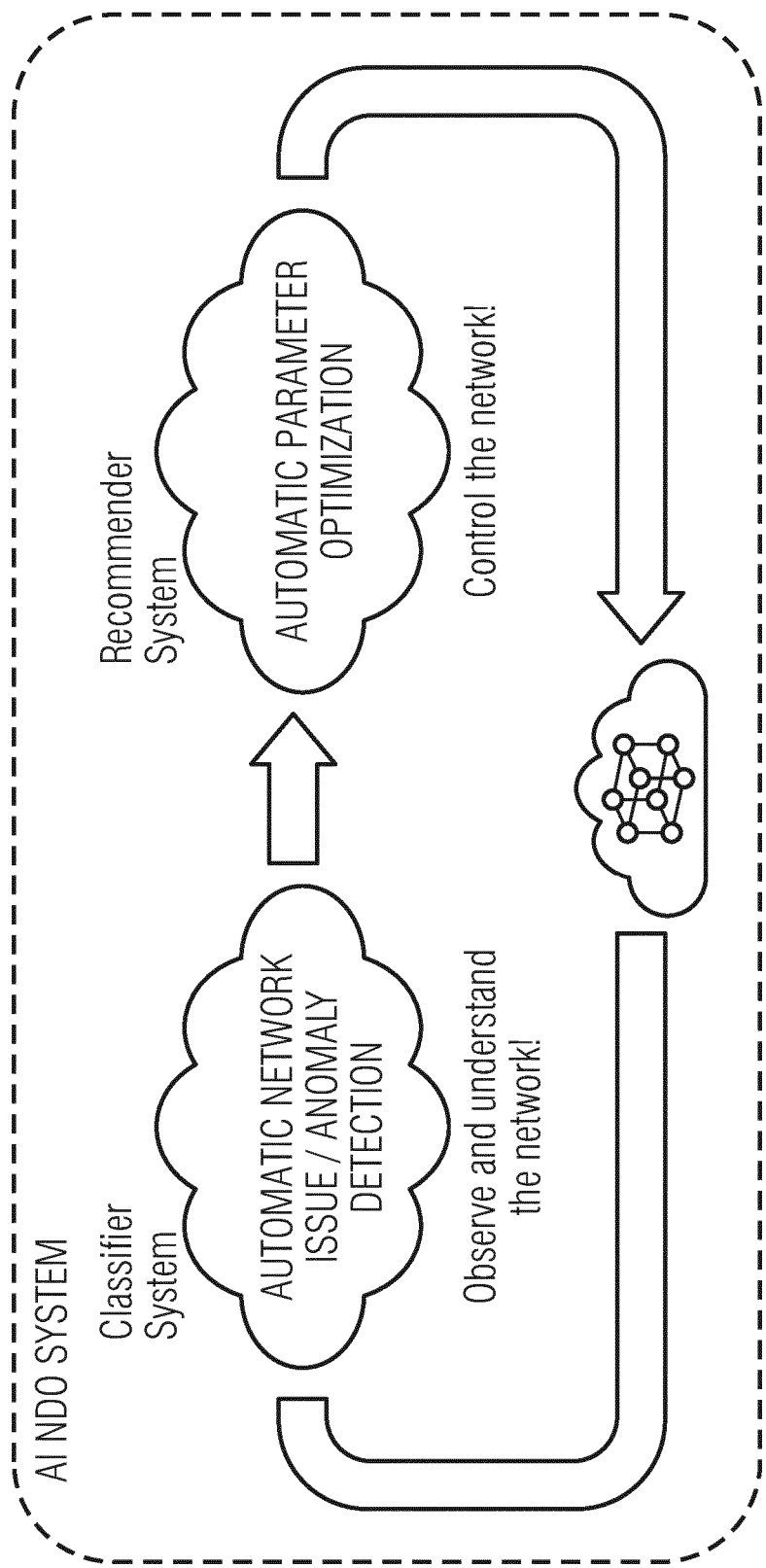
FIG. 4 shows a high-level diagram of an AI system for network design and optimization (NDO), according to various exemplary embodiments of the present disclosure.

Accordingly, exemplary embodiments of the present disclosure mitigate, reduce, and/or eliminate these and other exemplary problems, issues, and/or drawbacks by providing an Artificial Intelligence (AI) system for network design and optimization (NDO) consisting of three major parts: a classifier system, a recommender system, and an implementation engine/feedback loop. The classifier system can automatically detect and classify different issues in the network. The recommender system can provide detailed root-cause analysis and recommend potential actions to be implemented in the network. These recommendations can be implemented in the network and the resulting performance can be analyzed and fed back to the classifier system. FIG. 4 shows a high-level diagram of an AI system for network design and optimization (NDO), according to various exemplary embodiments of the present disclosure.

Certain embodiments can provide an intelligent UL performance recommender system to solve root cause classification from an intelligent classifier system by recommending UL performance parameters for optimization and tuning. Embodiments can utilize data from the same and other networks to learn different possible configurations, radio performance issues, and root causes, thereby reducing the need to perform iterative trialing of different configurations in an actual network. The outputs of the UL performance recommender system can be applied to NDO domain knowledge to select the best recommendation and to avoid conflicting recommendations.

Figure 5:
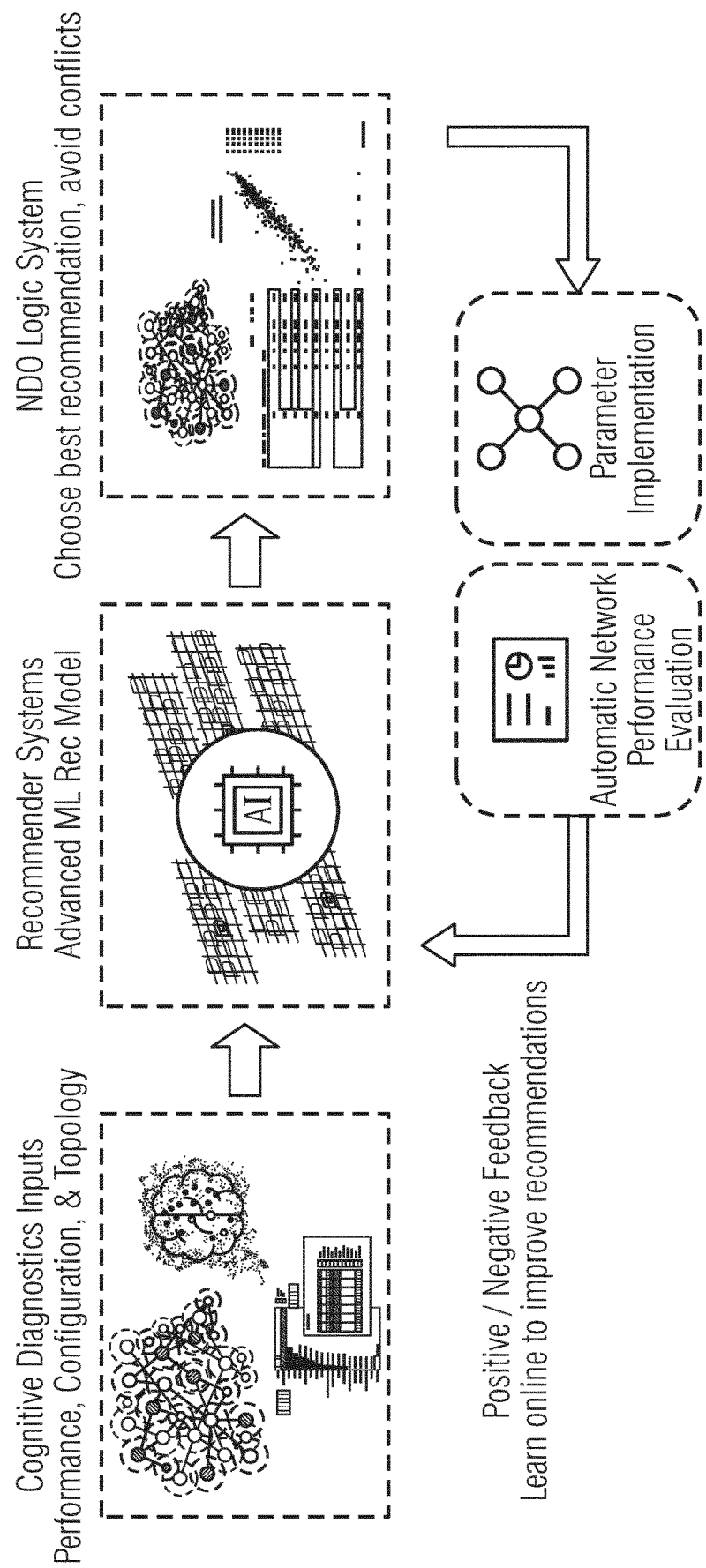
FIG. 5 shows an exemplary configuration of an uplink (UL) performance recommender system, according to various exemplary embodiments of the present disclosure.

FIG. 5 shows an exemplary configuration of embodiments of the UL recommender system. The recommender system can receive cognitive diagnostic inputs related to network performance (e.g., KPIs), network configuration, network topology, etc. The recommender system can apply an advanced machine learning (ML) model to these inputs to produce recommendations for performance improvements. The recommendations can be input to an NDO logic system to choose the best NDO recommendations while avoiding conflicting recommendations. The selected recommendations (e.g., network parameters) can be implemented in a network model, and the resulting network performance can be evaluated such that any positive or negative feedback on the recommendations can be incorporated into the recommender system to improve future recommendations.

Embodiments of the present disclosure, including those illustrated in FIGS. 4-5, can provide various benefits and/or advantages with respect to network performance optimization. In general, solving the very complex task of recommendation of UL performance parameters brings tremendous benefits in terms of scalability, accuracy, and automation. As a more specific example, embodiments can reduce the duration of a network parameter optimization process, including the need to run multiple configuration trials to evaluate recommendations for uplink performance. Moreover, recommendations can be learned and/or applied from configurations used in other parts of the network and/or in different networks, thereby reducing the time and effort needed to obtain optimal recommendations for a specific network. Furthermore, the ability to ingest numerous network metrics at serving cell/neighbor cell level also expedites network parameter optimization.

In addition, embodiments can facilitate optimization down to cell level and suitable parameter values can be implemented more frequently depending on dynamic traffic conditions and time of day. Embodiments can learn and/or reuse network configurations and radio performance from already collected data sources at cell-level and hour-level granularity. As such, embodiments can recommend UL performance configurations for changes in traffic for specified periods.

In addition, adjustment of network parameters can be done holistically, taking into consideration the interaction of all the cells in a target area. Traditionally, analysis is done on single cell only or as a network level—which are then trialed and analyzed for total impact of the change. Instead, embodiments can learn interaction between neighboring cells and recommend configuration improvements while considering impact on neighboring cells.

In addition, the recommender system embodiments of the present disclosure are adaptable, able to incorporate additional data from the same or other networks to learn new configurations and resulting performance that can be used for subsequent recommendations. Furthermore, embodiments can monitor any drifting of a model's performance and update as required. Embodiments also facilitate extension to recommendations for other configurations based on domain expert knowledge.

Figure 6:
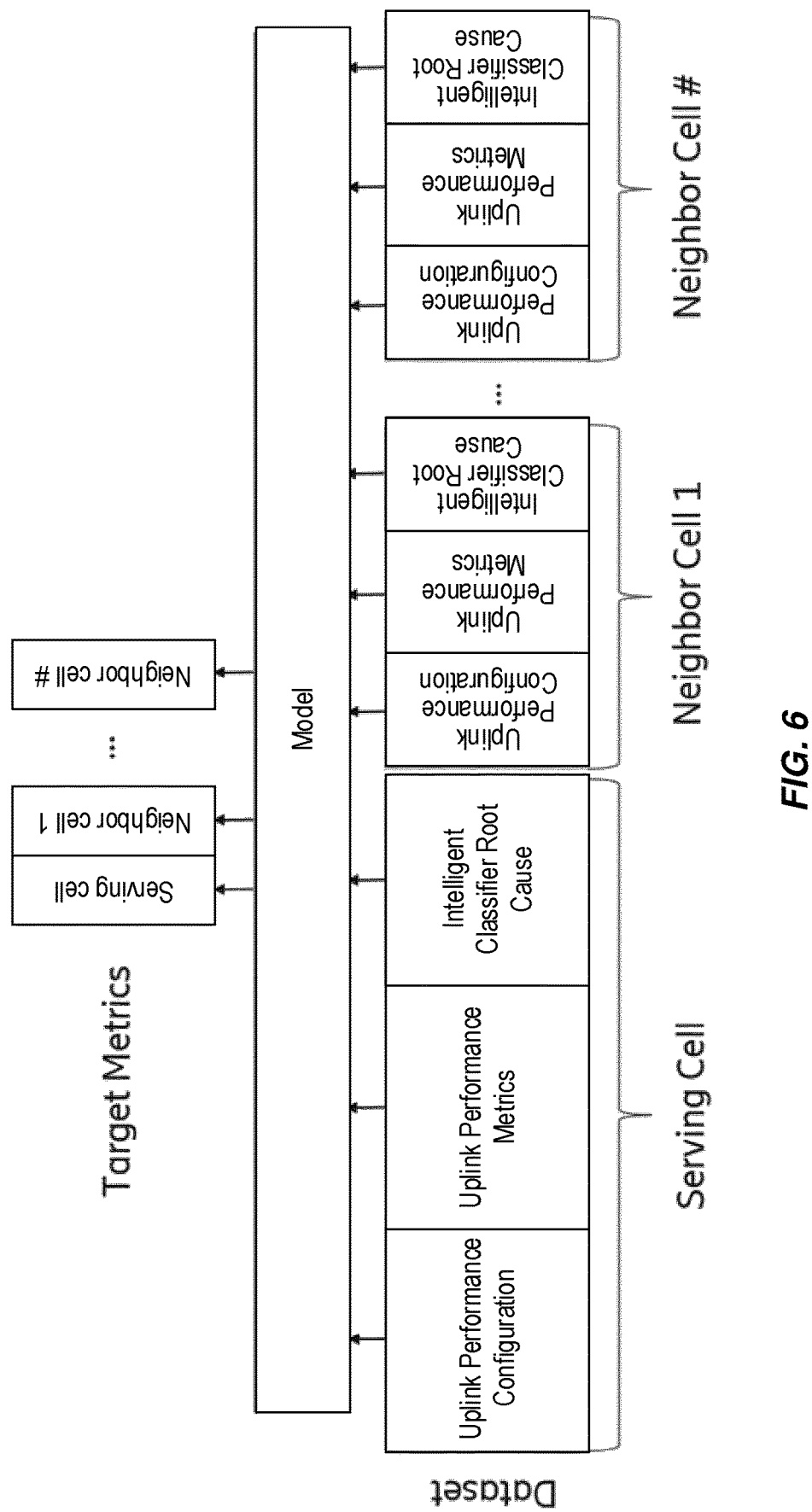
FIG. 6 shows a general architecture for various embodiments of the UL performance recommender system of the present disclosure

FIG. 6 shows a general architecture for various embodiments of the UL performance recommender system of the present disclosure. For each cell of interest in the network, the desired model output is one or more target metrics (e.g., of network performance parameters) for the serving cell and the top # of neighbor cells that interact with that serving cell. The model input is a dataset including, for the serving cell and each of the interacting neighbor cells, UL performance configuration, UL performance metrics (e.g., KPIs), and a root cause identified by an intelligent classifier system. If necessary, the dataset can be annotated by identifying UL metrics that are correlated to the UL performance parameters model output. A machine learning model can be applied to the dataset to make recommendations based on the respective target metrics.

The KPIs for each cell may relate to load experienced by the cell, interference experienced by the cell, radio conditions experienced by UEs served by the cell, etc. Such KPIs can include a relatively large number of performance metrics, including otherwise unconventional performance metrics, so long as they have sufficient correlation with UL performance. In an exemplary embodiment, some or all of the 33 KPIs listed in Table 1 below can be used. All KPIs can take on values between 0 and 1.

TABLE 1

| KPI name | Description |
| --- | --- |
| 'AVG_ACTIVE_USERS_DL' | Avg. number of active DL users per Time Transmission Interval (TTI) |
| 'AVG_ACTIVE_USERS_UL' | Active number of UL users per TTI |
| 'AVG_SE_DL' | Avg. number of DL scheduling entities per TTI |
| 'AVG_SE_UL' | Avg. number of UL scheduling entities per TTI |
| 'RRC_CONN_ATT' | RRC connection attempts |
| 'AVG_RRC_CONN_USERS' | Avg. number RRC_CONNECTED users |
| 'MAX_RRC_CONN_USERS' | Max. number RRC_CONNECTED users |
| 'DATAVOL_DRB_DL' | DL data volume for Data Radio Bearer (DRB) traffic |
| 'DATAVOL_DRB_UL' | UL data volume for DRB traffic |
| 'DATAVOL_SRB_DL' | DL data volume for Signaling Radio Bearer (SRB) traffic |
| 'DATAVOL_SRB_UL' | UL data volume for SRB traffic |
| 'AVG_PRB_UTIL_DL' | Avg. DL physical resource block (PRB) utilization |
| 'AVG_PRB_UTIL_UL' | Avg. UL PRB utilization |
| 'AVG_PDCCH_CCE_LOAD' | Avg. PDCCH control channel element (CCE) load |
| 'AVG_CQI' | Avg. channel quality indicator (CQI) value |
| 'CQI_BELOW_6_RATE' | Portion of CQI values below six (6) |

TABLE 1-continued

| KPI name | Description |
| --- | --- |
| 'AVG_USER_THP_DL' | Avg. DL user throughput |
| 'AVG_USER_THP_UL' | Avg. UL user throughput |
| 'RA_CBRA_MSG2_ATT' | UE attempts on RACH |
| 'ROBUST_RA_SR' | UE random access success ratio |
| 'AVG_HARQ_DTX_DL' | Avg. DL hybrid ARQ (HARQ) discontinuous transmission (DTX) ratio |
| 'AVG_HARQ_DTX_UL' | Avg. UL HARQ DTX ratio |
| 'AVG_PUSCH_SINR' | Avg. PUSCH signal to interference plus noise ratio (SINR) |
| 'AVG_PUCCH_SINR' | Avg. PUCCH SINR |
| 'PUSCH_SINR_BELOW_NEG2DB_RATE' | Portion of PUSCH SINR below −2 dB |
| 'PUCCH_SINR_BELOW_NEG0DB_RATE' | Portion of PUCCH SINR below 0 dB |
| 'AVG_N_I_PUSCH' | Avg. PUSCH interference level |
| 'AVG_N_I_PUCCH' | Avg. PUCCH interference level |
| 'UL_PATHLOSS_ABOVE_130DB_RATE' | Portion of UL pathloss above 130 dB |
| 'AVG_UL_PATHLOSS' | Avg. UL pathloss |
| 'UL_TB_POWER_LIMITED' | Portion of UE UL transmit power limited |
| 'AVG_MP_LOAD' | Avg. processor load |
| 'MP_LOAD_ABOVE_80_RATE' | Portion of processor load >80% capacity |

The UL performance configurations can include various cell configuration parameters that affect UL performance. Some examples include pZeroNominalPUSCH (target power level (dBm) that eNB receiver wants to receive per resource block on PUSCH) and alpha (configures use of fractional power control, range 0-1).

The intelligent classifier root cause data shown in FIG. 6 can indicate that a network root cause classification system has flagged a particular serving cell as having UL performance issues. As discussed below, these cells will have their datasets extracted, transformed, and analyzed to determine recommended configurations for performance improvements according to target metrics for the cells and top interacting neighbor cells.

FIG. 7 shows a flow diagram of a procedure for creation and deployment of the UL performance recommender system model, according to various exemplary embodiments of the present disclosure. First, data can be extracted from multiple data sources to form a dataset. Next, the dataset can be transformed by encoding and cascading with other datasets (e.g., neighbor cells). Subsequently, the model is built via training, evaluation, and feedback. Upon satisfactory evaluation of model performance metrics (e.g., prediction and/or recommendation errors), the model can be deployed as part of a network optimization platform (e.g., in FIGS. 4-6). Subsequently, recommendations made by the deployed model can be analyzed to ensure continued quality, with improvements made as needed.

Recommendations from the recommender are passed to the NDO Logic System. Since the recommender system will generate parameter recommendations for various cells in the network, there may be conflicts between recommendations for various cells that interact with each other (e.g., neighbor cells). The NDO Logic System can identify these conflicts, evaluate the area of impact, and determine what recommendation(s) should be made for the area of impact. The recommendations per area are then evaluated to determine if there are interacting areas impacted. These are then resolved and re-ranked based on the NDO logic.

FIG. 8 shows a flow diagram of a procedure for creation and deployment of an NDO logic system that can be used with the UL performance recommender, according to various exemplary embodiments of the present disclosure (e.g., FIG. 5). First, recommendations from the recommender system are evaluated to detect conflicts and group the detected conflicts into interacting areas. Next, the grouped conflicting recommendations are evaluated to determine which would provide the greatest benefit (e.g., based on statistical information) in the particular area. Subsequently, the interactions between areas are evaluated to determine recommendations that provides the greatest overall benefit. Finally, the recommendations are ranked (or re-ranked) according to degree of benefit.

Figure 10:
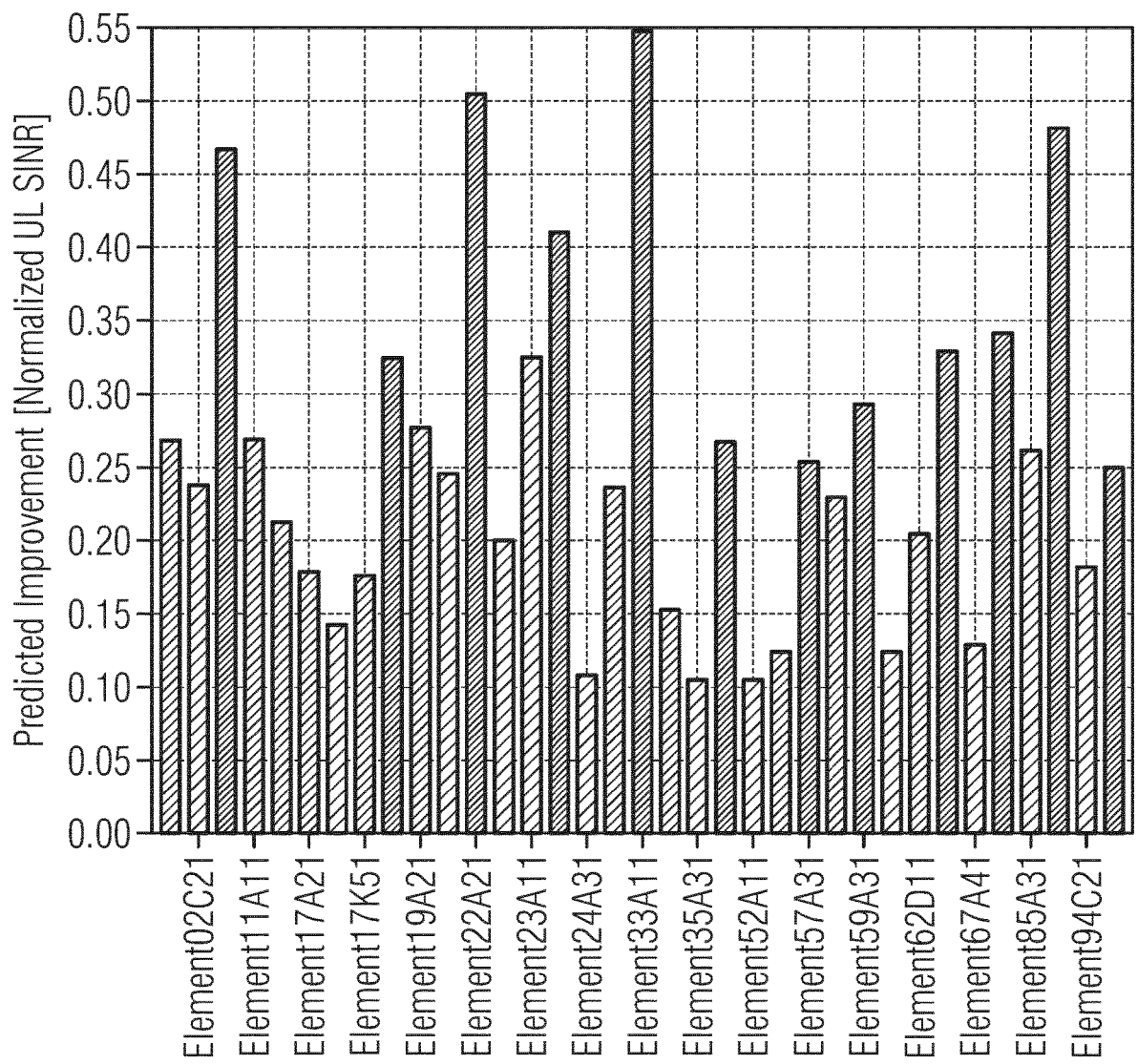

FIGS. 9-10 show exemplary outputs of an embodiment of the NDO logic system for evaluating UL performance recommendations. As shown in FIG. 9, for this example, the NDO logic system determined that tuning a parameter for a serving cell ("CID issue cell") was preferred in 25% of cells examined, and that tuning the same parameter for a neighbor cell was preferred in 17% of the cells examined. In addition, no better configuration was found for 58% of all cells examined. FIG. 10 shows a predicted performance improvement due to tuning the cell parameters. The target performance metric in this example is UL signal-to-interference-plus noise ratio (SINR). In general, the range of improvement in UL SINR is in the range of 0.1-0.55 on a normalized scale.

Figure 11:
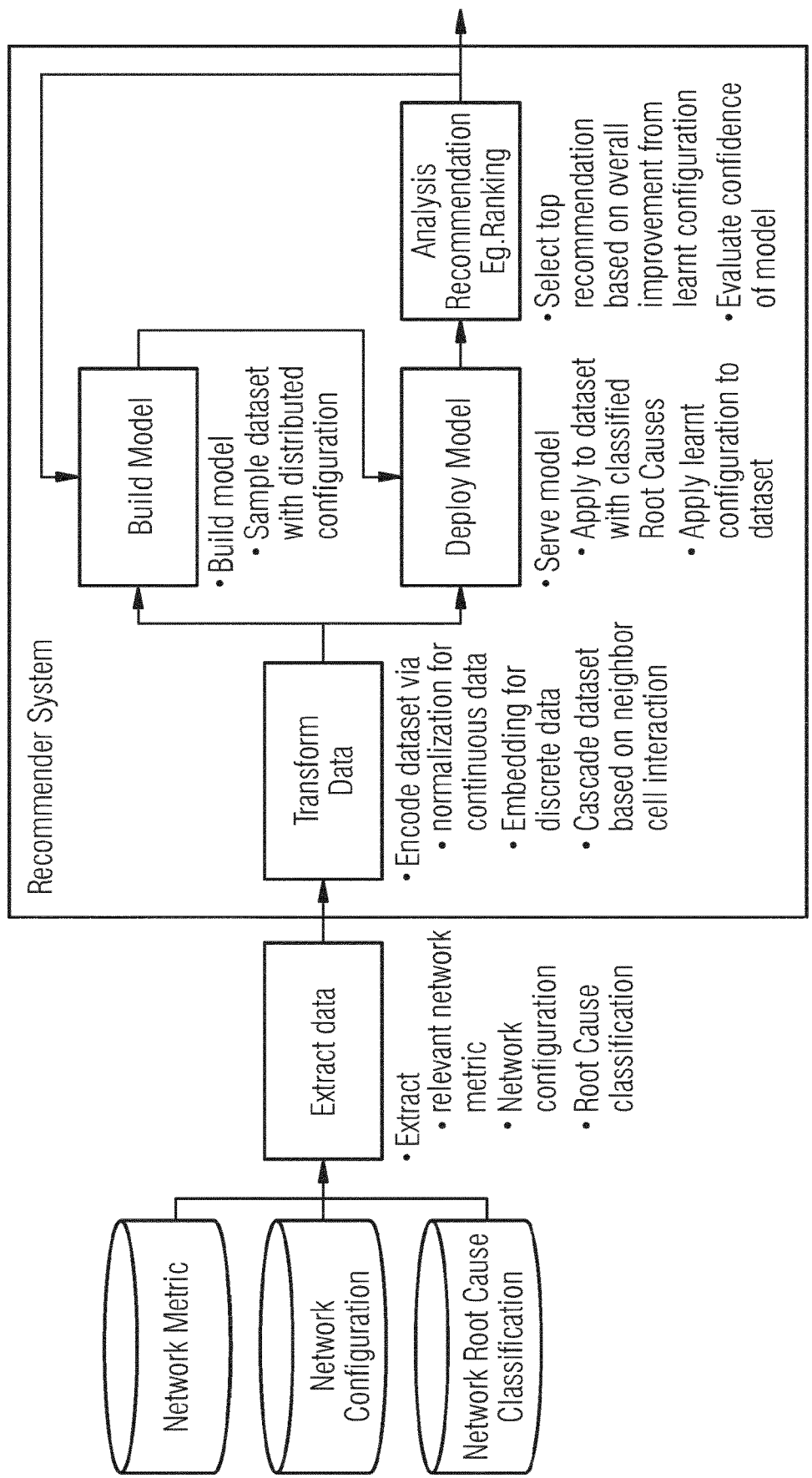
FIG. 11 shows a more detailed block diagram of the UL performance recommender model, according to various exemplary embodiments of the present disclosure.

FIG. 11 shows a more detailed block diagram of the UL performance recommender system, according to various exemplary embodiments of the present disclosure. A relevant dataset is created and/or extracted for various cells in the network, including network performance metrics/KPIs, network configuration, network root cause classification, etc.

The extracted dataset can then be transformed and/or encoded. For example, normalization (also referred to as "encoding") can be applied to continuous-valued network performance metrics. For discrete metrics such as the network configuration or network root cause classification, an embedding process can be used.

Since cell UL performance is impacted by neighbor cells interaction, the transformation also maps, associates, and/or "cascades" certain network performance metrics of a serving cell to the top N interacting neighbor cells. For example, N=3 interacting neighbor cells can be selected based on a metric related to handover attempts between respective cells. The resulting dataset can be similar to the arrangement shown in FIG. 6.

Figures 12, 13:
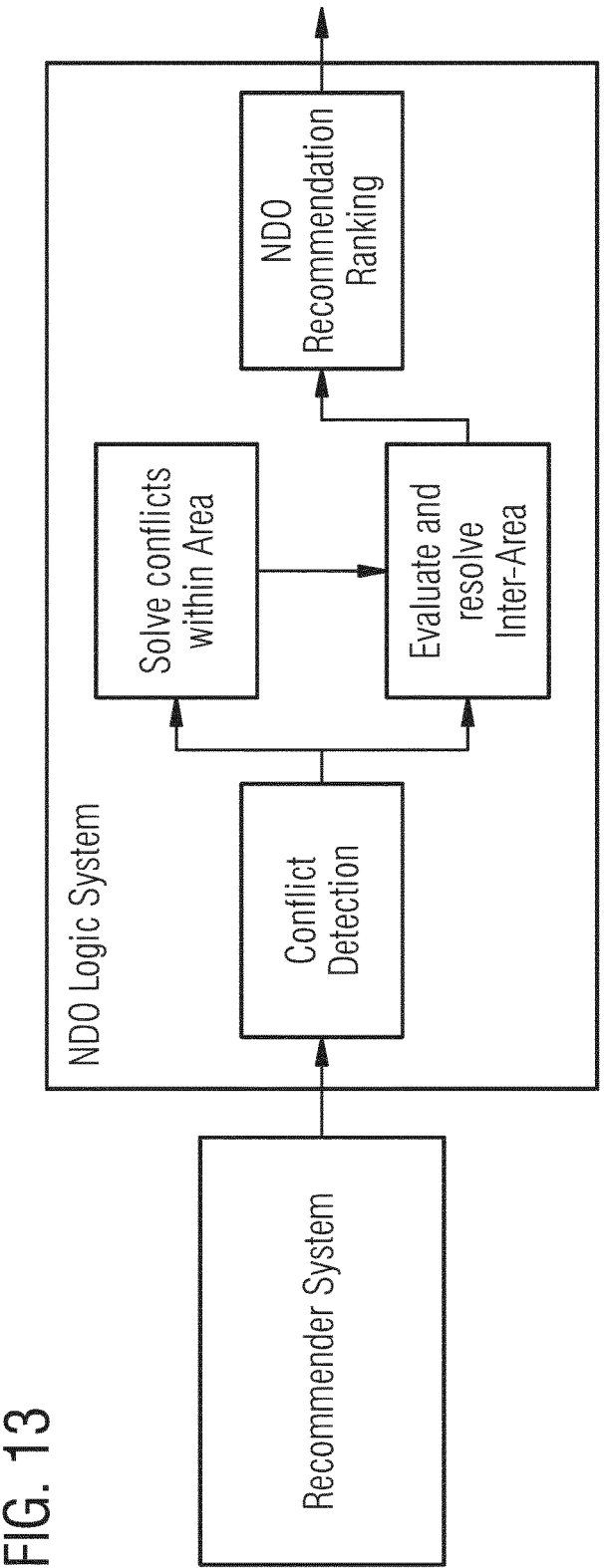
FIG. 12 shows an exemplary distribution of values for the configuration parameter pZeroNominalPUSCH.
FIG. 13 shows a more detailed block diagram of the NDO logic system, according to various exemplary embodiments of the present disclosure.

In general, individual networks usually include very few different configurations, e.g., one or two main primary configurations of any particular parameter. FIG. 12 shows an exemplary distribution of values for the configuration parameter pZeroNominalPUSCH. It is clear from FIG. 12 that a single configuration (i.e., −103 dBm) for this parameter occurs three orders of magnitude more frequently than any other configuration. This lack of configuration diversity can lead to skewing of the recommended network configurations. Accordingly, in some embodiments, a random sample collection based on the serving cell's and neighboring cell's configurations can be performed. This is discussed in more detail below.

Based on the transformed dataset, a deep matrix factorization model can be built and/or created ("build model" in FIG. 11). Alternately, a wide factorization model can be created. Since the model input is a dataset for serving cell and neighbor cells, the predictive output is generally an array of predictive values for serving cell and neighbor cells, as illustrated by "target metrics" in FIG. 6.

For the model to be maintained and updated with minimal effort, selected target performance metrics (KPIs) should be continuous-valued and should have a strong correlation to what is considered as "UL performance." The KPIs shown in Table 1 are examples of metrics that can exhibit such strong correlation. For continuous-valued target metrics, an R-square statistic is used to evaluate model performance as well as the residual distribution between actual and predicted performance. For example, a desirable level of performance on training and test datasets is indicated by a high R-squared value and a low residual distribution (e.g., less than 1% of samples having greater than 10% residual).

The model, with the selected KPIs, can be applied to other datasets in order to evaluate confidence in the model's ability to predict its own configuration by matching a predicted target metric match to an actual performance metric. If the difference between predicted and actual metric is less than a threshold (e.g., 10%), then there is a high level of confidence that the model will be able to infer a target prediction if the network configuration was to be changed to a different "learned configuration."

In the "Deploy Model" process, the cells with issues, along with neighbor cell metrics, are identified by "Network Root Cause Classification" and served by the recommender model. The recommender model will run cases by testing the different learned network configurations into a serving cell's network configuration. The different network configurations for the serving cell will have respective predictive values.

The output from the deployed model is then run through an "Analysis Recommendation" process that evaluates whether the respective network configurations provide an improved target metric compared to the actual target metric of the current serving cell configuration. The weighted average of the impact of the interacting neighbor cells on each serving cell is also considered in the evaluation. The top-ranking configuration can be selected as a recommendation to be passed into the NDO logic system for uplink performance. However, an improvement threshold can also be employed, such that if a recommendation's improvement does not exceed the threshold (e.g., 10%), then that particular recommendation is not provided.

The continuous monitoring of confidence in the model's ability to predict its own configuration by matching a predicted target metric match to an actual performance metric can also be performed in this process to ensure model quality and determine any needed updates.

As illustrated in FIG. 13, the output of the recommender system is input to the NDO logic system. The four primary tasks of the NDO logic system is conflict detection (e.g., between recommendations), resolving conflicts within an area, resolving inter-area conflicts, and ranking of recommendations. These are discussed in more detail below.

The top-ranking configurations are grouped into areas of high neighbor cell interaction. Within each area, it is determined whether any two or more recommendations may produce unexpected and/or undesirable results. In general, the recommender system provides recommendations for one network element (e.g., cell) while maintaining the current configurations of the interacting neighboring elements (e.g., neighbor cells). Consequently, if more than one recommendation is made within an interacting area (e.g., changes for multiple interacting cells), then implementing all of these recommendations can result in inconsistencies and/or conflicts in the UL radio environment used for prediction.

As such, if a conflict is present in an area, then the NDO system resolves it by selecting the recommendation providing the greatest expected improvement (e.g., best uplink performance, greatest number of users positively impacted, etc.) and discarding the other recommendations for the interacting area. Also, to ensure that no area improvement is obtained at expense of degrading another cell in the area, individual impact analysis for all cells within the area is performed. If the recommendation with the greatest improvement also degrades another cell in the interacting area, then the recommendation having the next greatest improvement is selected for analysis.

After resolving conflicts within an interacting area, the NDO logic system can evaluate inter-area conflicts. These conflicts can exist because the respective areas are not necessarily disjoint sets of cells, e.g., one or more cells can be common to multiple interacting areas. If that happens, the NDO system needs to analyze if changes proposed in one area will impact recommendations for a different area. If the recommendations for interacting areas are the same configuration then that is considered as the best recommendation. If multiple recommendations are present, then the recommendation with the greatest expected improvement is selected. Once both intra-area and inter-area conflicts are resolved, the recommendations for the UL performance are ranked for implementation.

Figure 14:
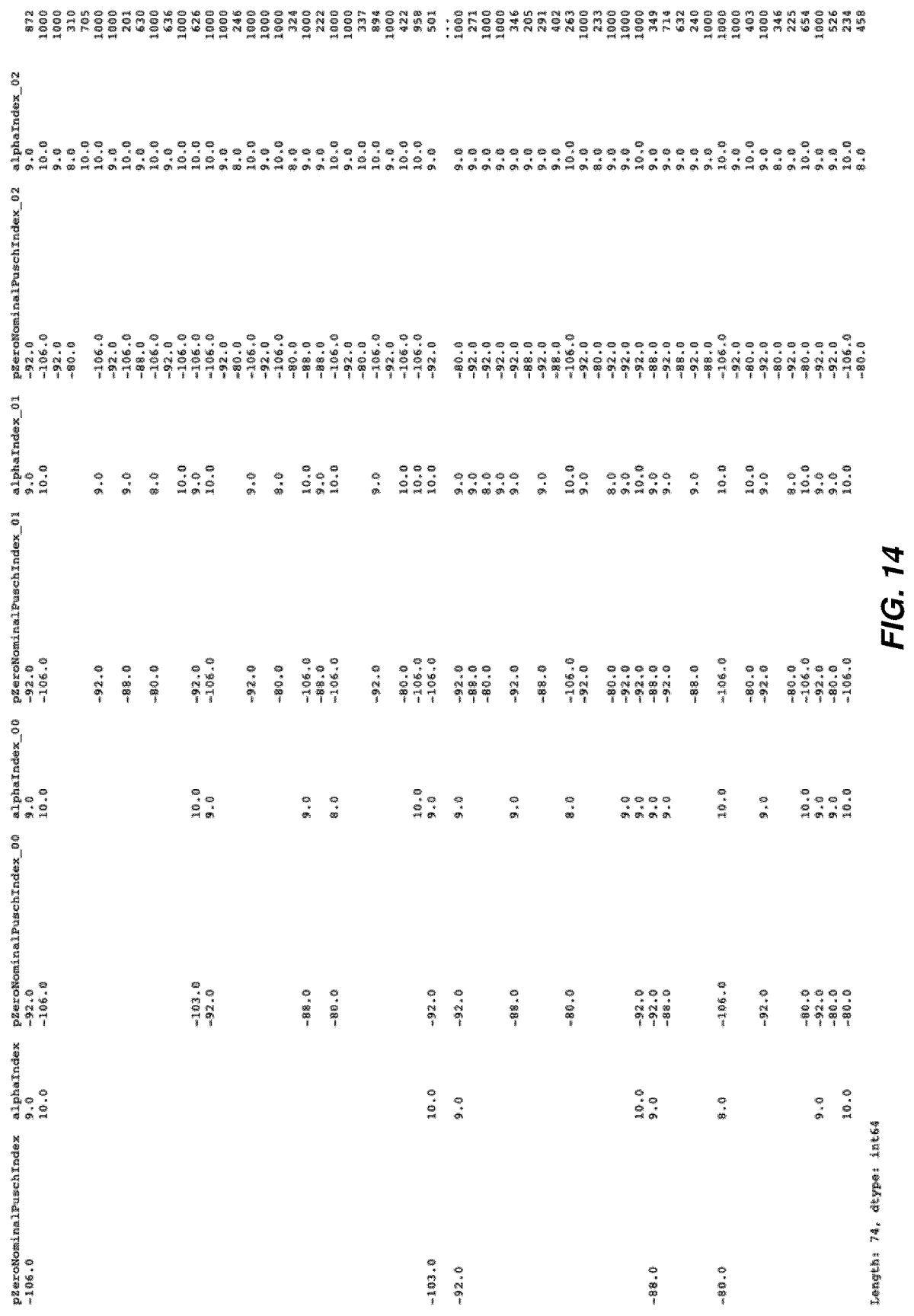

As mentioned above, lack of configuration diversity can lead to skewing of the recommended network configurations. Accordingly, in some embodiments, a random sampling based on the serving cell's and neighboring cell's configurations can be performed. FIG. 14 illustrates a distribution of network configurations when considering neighbor interaction based on random sampling, according to various exemplary embodiments of the present disclosure. In this distribution, the maximum number of samples per network configuration is 1000, as indicated by the rightmost column. The next two columns from the right indicate alpha and pZeroNominalPUSCH parameters corresponding to each of the network configurations.

FIG. 15 illustrates a subset of the results of applying an UL performance recommender model on previously unseen dataset. Note that in the table shown in FIG. 15, discrete indices are used for the network configuration parameters alpha and pZeroNominalPUSCH rather than the actual numerical values. The columns of most interest in FIG. 15 are "r2", ">10%", and ">20%". The column r2 represents the R-square score, with values greater than 0.8 indicating high correlation between actual and predicted target metric. The columns ">10%" and ">20%" represent the portion (e.g., 0-1) of samples exceeding that difference between actual and predicted target metric. For example, a value of 0.007 in ">20%" indicates that 0.7% of samples have a difference between actual and predicted target metric greater than 20%.

Figure 16:
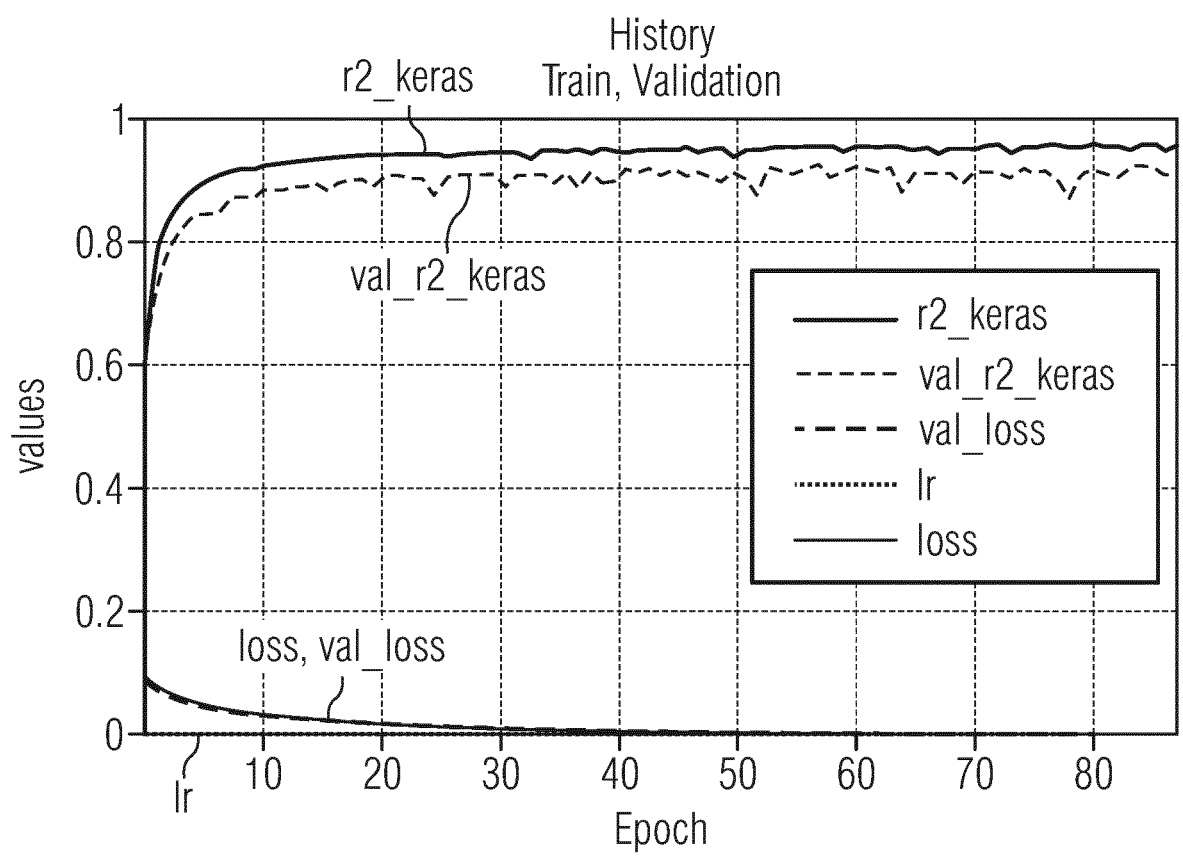
FIG. 16 illustrates an exemplary learning history for an exemplary UL performance recommender model.

FIG. 16 illustrates an exemplary learning history for an exemplary model used for the UL performance recommender system. In particular, FIG. 16 shows that the R-squared values (labelled "r2_keras" and "val_r2_keras") converge to 0.9 or above after about 20 training epochs. As mentioned above, an R-squared value of 0.9 indicates very high correlation between actual and predicted values. Furthermore, the loss parameters converge to nearly zero after 30-40 training epochs.

FIG. 17 illustrates an example output of the UL recommender system after analysis. Each of the lines 0-15 are associated with a single object (e.g., cell) that is assigned an object number. Columns 3-5 show the top three recommended configurations for each cell in order of preference, based on the corresponding predicted improvements in columns 6-8. Each configuration includes two indices that associated with respective values of configuration parameters alpha and pZeroNominalPUSCH. The ninth column (i.e., second from right) represents the current configuration for each cell, using the same indexing scheme for the parameters as in columns 3-5. The right-most column shows the actual performance gain for the recommended configuration for each of the cells.

Figure 18:
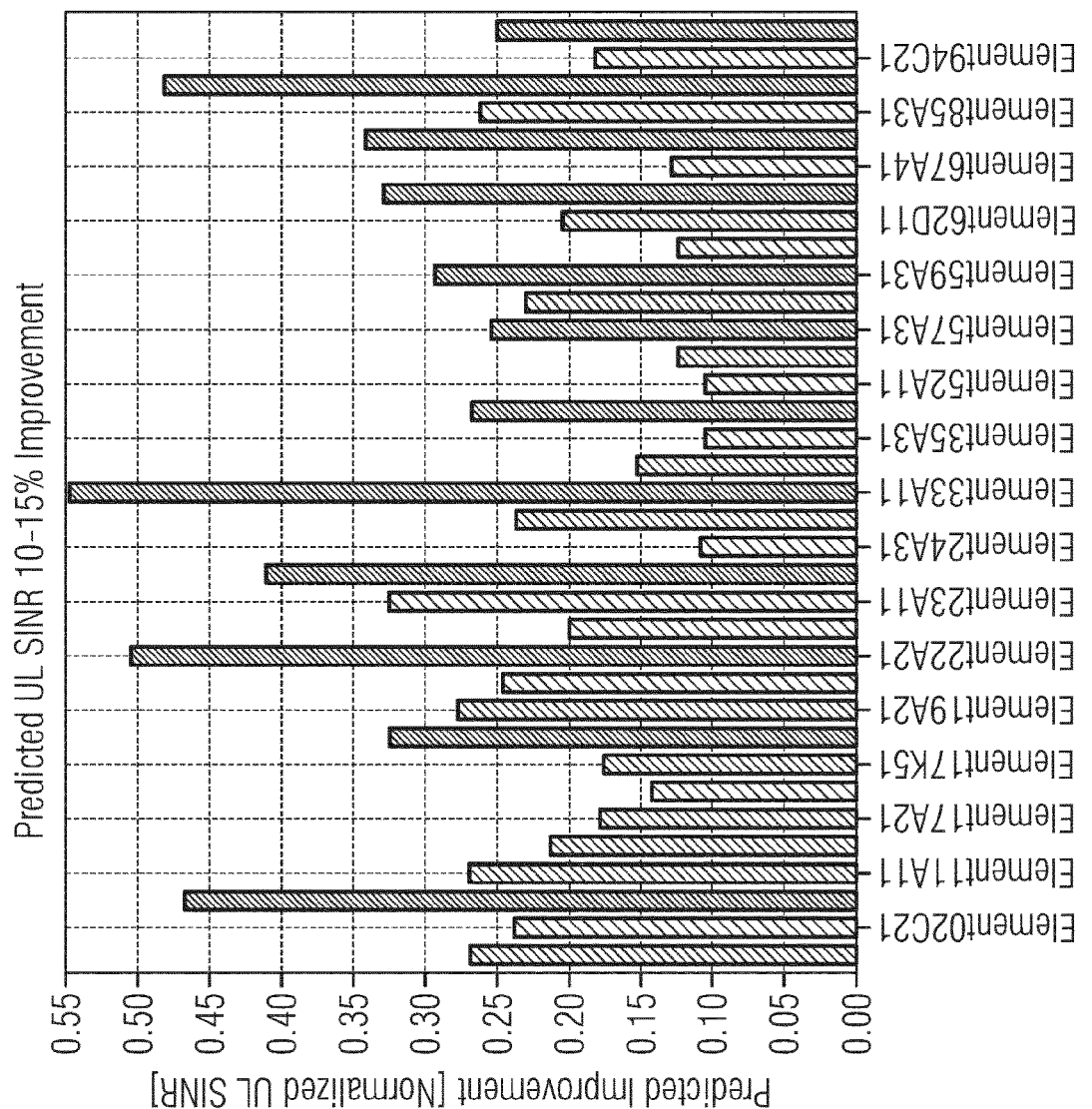
FIG. 18 illustrates a visualization of the gains from improvements recommended by the UL performance recommender after further processing by the NDO logic system.
Figure 18:
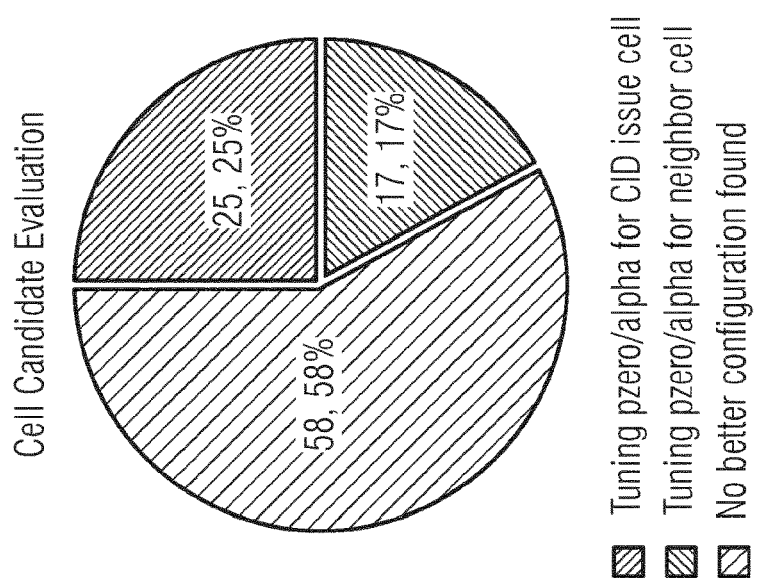

FIG. 18 illustrates a visualization of the gains from improvements recommended by the UL performance recommender system after further processing by the NDO logic system. For 58% of all cells that were classified as having a performance issue, the combined system did not recommend a configuration change. The graph at right shows the relative amount of improvement for the various cells of the 42% for which a configuration change was recommended.

Figure 19:
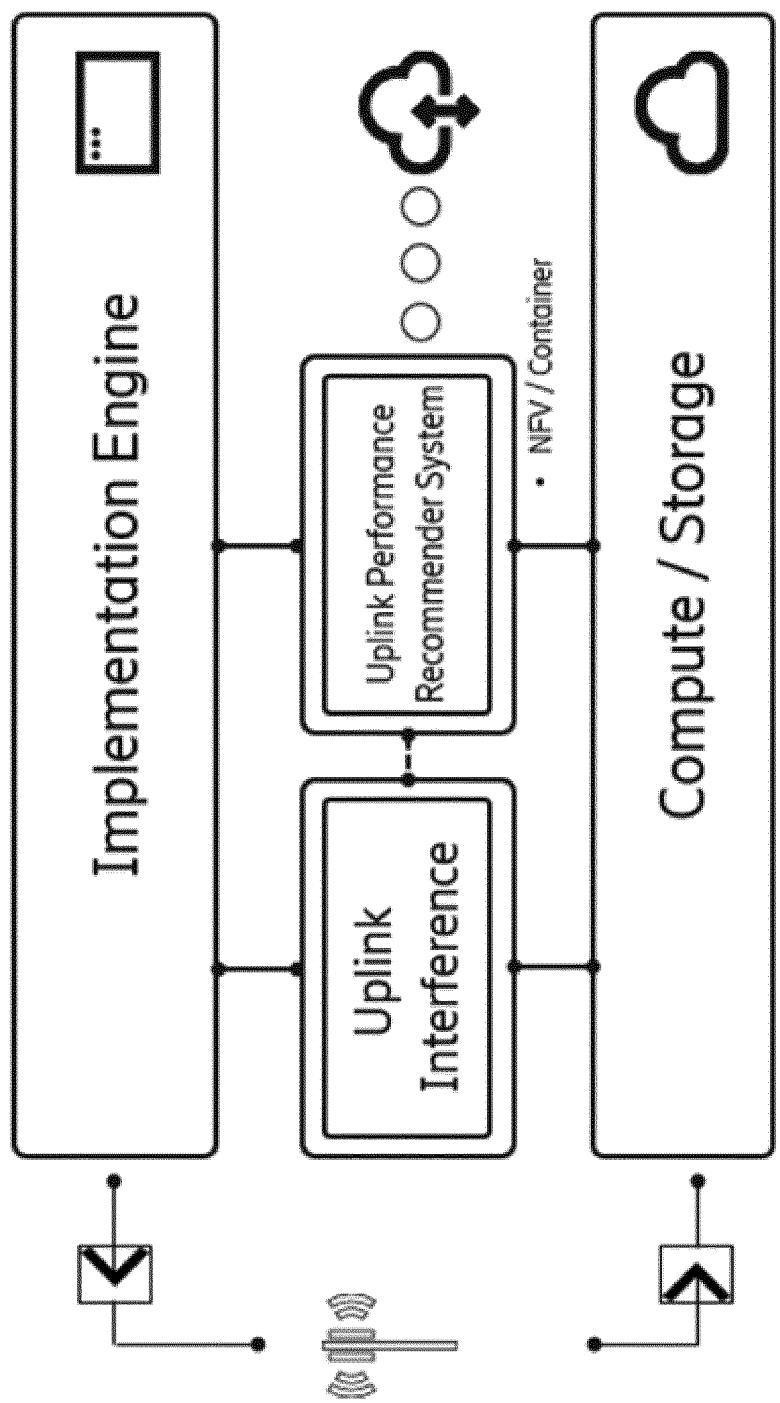
FIG. 19 shows an exemplary architecture for implementation of an UL performance recommender system, according to various exemplary embodiments of the present disclosure.

FIG. 19 shows an exemplary architecture for implementation of an UL performance recommender system, according to various exemplary embodiments of the present disclosure. The UL performance recommender system can be implemented as a virtualized network function (NFV) that utilizes computing and/or storage resources provided by one or more physical network nodes in an LTE network (e.g., in E-UTRAN or EPC). This can also be referred to as "containerized" implementation. The UL performance recommender system can communicate with other machine learning modules and/or functions associated with the LTE network, such as an UL interference classifier, cell issue classifier (not shown), etc. In some embodiments, the UL performance recommender system can be a cloud-based function that is hosted by computing and/or storage resources outside of the LTE network.

The embodiments described above can be further illustrated with reference to FIG. 20, which includes FIGS. 20A-C. Put differently, various features of the operations described below correspond to various embodiments described above.

Figure 20A:
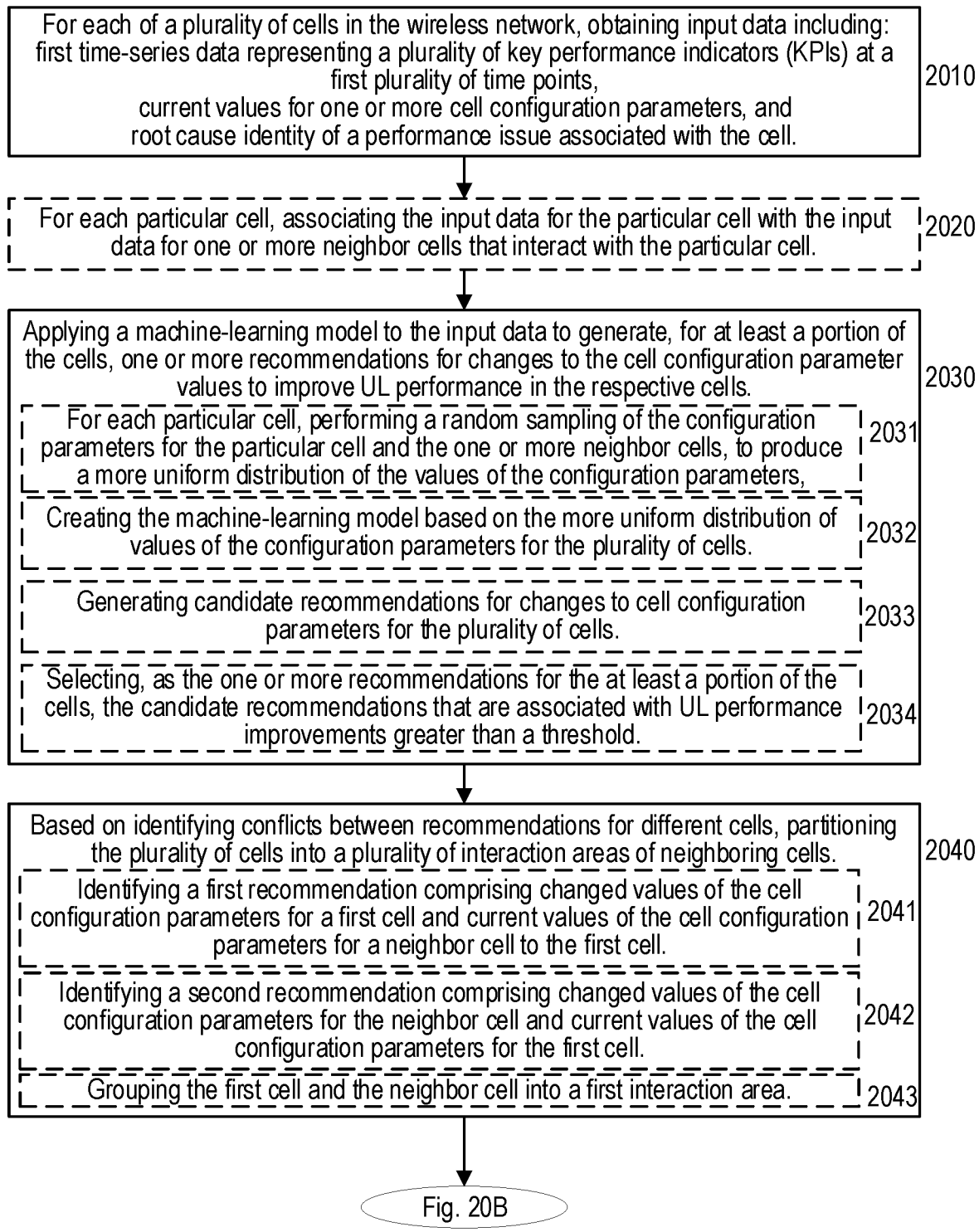
FIGS. 20A-B show a flow diagram of an exemplary method performed by an uplink (UL) performance recommender system for a wireless network (e.g. LTE E-UTRAN), according to various exemplary embodiments of the present disclosure.
Figure 20B:
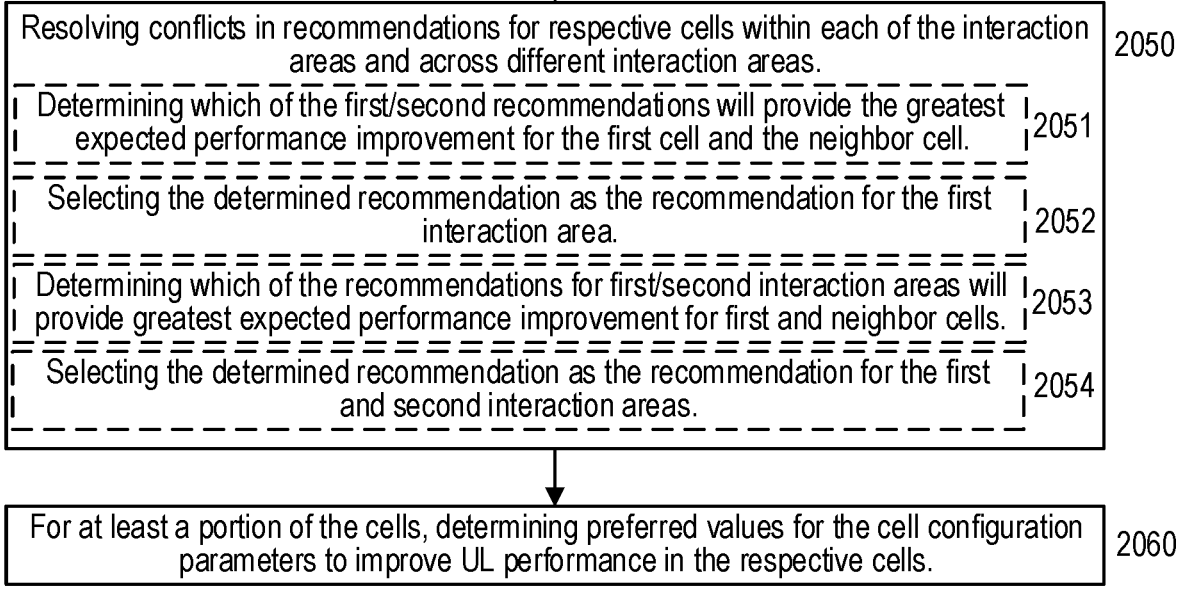

In particular, FIGS. 20A-B show a flow diagram of an exemplary method (e.g., procedure) performed by an uplink (UL) performance recommender system for a wireless network (e.g. LTE E-UTRAN), according to various exemplary embodiments of the present disclosure. The UL performance recommender system can be implemented by processing and/or communication resources provided by one or more nodes, e.g., in a wireless network or in a cloud-computing infrastructure associated with the wireless network. Furthermore, the exemplary method shown in FIG. 20 can be used cooperatively with other exemplary systems and/or procedures described herein (e.g., FIGS. 4-5, 7-8, 11, 13) to provide various exemplary benefits described herein. Although FIG. 20 shows specific blocks in a particular order, the operations of the exemplary method can be performed in a different order than shown and can be combined and/or divided into blocks with different functionality than shown. Optional blocks or operations are indicated by dashed lines.

The exemplary method can include the operations of block 2010, where the UL performance recommender system can obtain input data for each of a plurality of cells in the wireless network. For each cell, the input data can include (first) time-series data representing a plurality of key performance indicators (KPIs) at a (first) plurality of time points, current values for one or more cell configuration parameters, and root cause identity of a performance issue associated with the cell. In some embodiments, the exemplary method can also include the operations of block 2020, where the UL performance recommender system can, for each particular cell, associate the input data for the particular cell with the input data for one or more neighbor cells that interact with the particular cell. For example, the one or more neighbor cells that interact with the particular cell can be selected based on input data relating to handover attempts between the respective cells.

The exemplary method can also include the operations of block 2030, where the UL performance recommender system can apply a machine-learning model to the input data to generate, for at least a portion of the cells, one or more recommendations for changes to the cell configuration parameter values to improve UL performance in the respective cells. In some embodiments, the machine-learning model can include a deep matrix factorization model. The exemplary method can also include the operations of block 2040, where the UL performance recommender system can, based on identifying conflicts between recommendations for different cells, partition the plurality of cells into a plurality of interaction areas of neighboring cells.

The exemplary method can also include the operations of block 2050, where the UL performance recommender system can resolve conflicts in recommendations for respective cells within each of the interaction areas and across different interaction areas. The exemplary method can also include the operations of block 2060, where the UL performance recommender system can, for at least a portion of the cells, determine preferred values for the cell configuration parameters to improve UL performance in the respective cells.

In some embodiments, the operations of block 2030 can also include the operations of sub-blocks 2031-2032. In sub-block 2031, the UL performance recommender system can, for each particular cell, perform a random sampling of the configuration parameters for the particular cell and the one or more neighbor cells, to produce a more uniform distribution of the values of the configuration parameters. In sub-block 2032, the UL performance recommender system can create the machine-learning model based on the more uniform distribution of values of the configuration parameters for the plurality of cells.

In some embodiments, the operations of block 2030 can include the operations of sub-blocks 2033-2034. In sub-block 2033, the UL performance recommender system can generate candidate recommendations for changes to cell configuration parameters for the plurality of cells. In sub-block 2034, the UL performance recommender system can select, as the one or more recommendations for the at least a portion of the cells, the candidate recommendations that are associated with UL performance improvements greater than a threshold. For example, the threshold can be a 10% performance improvement, as discussed above. Other threshold performance improvements can also be used.

In some embodiments, the operations of block 2040 can also include identifying the conflicts between recommendations for different cells, which can include the operations of sub-blocks 2041-2032. In sub-block 2041, the UL performance recommender system can identify a first recommendation comprising changed values of the cell configuration parameters for a first cell and current values of the cell configuration parameters for a neighbor cell to the first cell. In sub-block 2042, the UL performance recommender system can identify a second recommendation comprising changed values of the cell configuration parameters for the neighbor cell and current values of the cell configuration parameters for the first cell.

In such case, there will be an identified conflict between the two recommendations due to the different parameter values recommended for the same cell. In such embodiments, the partitioning operations in block 2040 can also include the operations of sub-block 2043, where the UL performance recommender system can group the first cell and the neighbor cell into a first interaction area.

In some embodiments, the resolving conflicts operations of block 2050 can include the operations of sub-blocks 2051-2052. In sub-block 2051, the UL performance recommender system can determine which of the first and second recommendations (e.g. for the first interaction area) will provide the greatest expected performance improvement for the first cell and the neighbor cell. In sub-block 2052, the UL performance recommender system can select the determined recommendation as the recommendation for the first interaction area.

In some embodiments, the first interaction area can overlap with a second interaction area by one or more common cells. In such embodiments, for at least one of the common cells, the recommendation for the second interaction area can conflict with the recommendation for the first interaction area. In such embodiments, the resolving conflicts operations of block 2050 can also include the operations of sub-blocks 2053-2054. In sub-block 2053, the UL performance recommender system can determine which of the recommendations for the first and second interaction areas will provide the greatest expected performance improvement for the first and second interaction areas. In sub-block 2054, the UL performance recommender system can select the determined recommendation as the recommendation for the first and second interaction areas.

In various embodiments, the cell configuration parameters (e.g., for which values are obtained in the input data) can include target UL received power level on PUSCH (pZeroNominalPUSCH) and/or fractional power control setting (alpha). These parameters are exemplary and other configuration parameters relevant to UL performance in a cell can also be included or can be included instead of alpha and/or pZeroNominalPUSCH.

In various embodiments, the plurality of KPIs (e.g., for which values are obtained in the input data) can include at least two of the KPIs listed in Table 1 above. However, the plurality of KPIs can include other KPIs than those listed in Table 1 above.

Figure 20C:
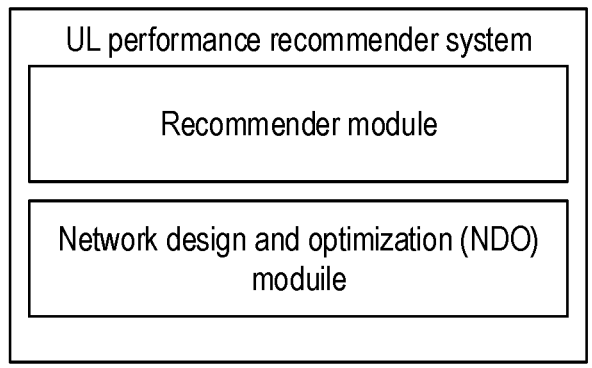
FIG. 20C shows an exemplary module-based implementation of an UL performance recommender system, according to various exemplary embodiments of the present disclosure.

FIG. 20C shows an exemplary module-based implementation of an UL performance recommender system, according to various exemplary embodiments of the present disclosure. In particular, the UL performance recommender system shown in FIG. 20C includes a recommender module and a network design and optimization (NDO) module. The modules can include functionality corresponding to the operations of the exemplary method shown in FIG. 20A-B and described above. For example, the recommender module can be configured to perform the operations of blocks 2010-2030 (including sub-blocks), described above. Also, the NDO module can be configured to perform the operations of blocks 2040-2050 (including sub-blocks), described above. However, this partitioning of functionality between the two modules is merely exemplary, and modules with other names can be introduced as needed and/or desired.

In addition, embodiments of the UL performance recommender system can be implemented by a performance-monitoring node in the wireless network, such as a network node in an E-UTRAN or an EPC, or exemplary network nodes described in more detail below.

Figure 21:
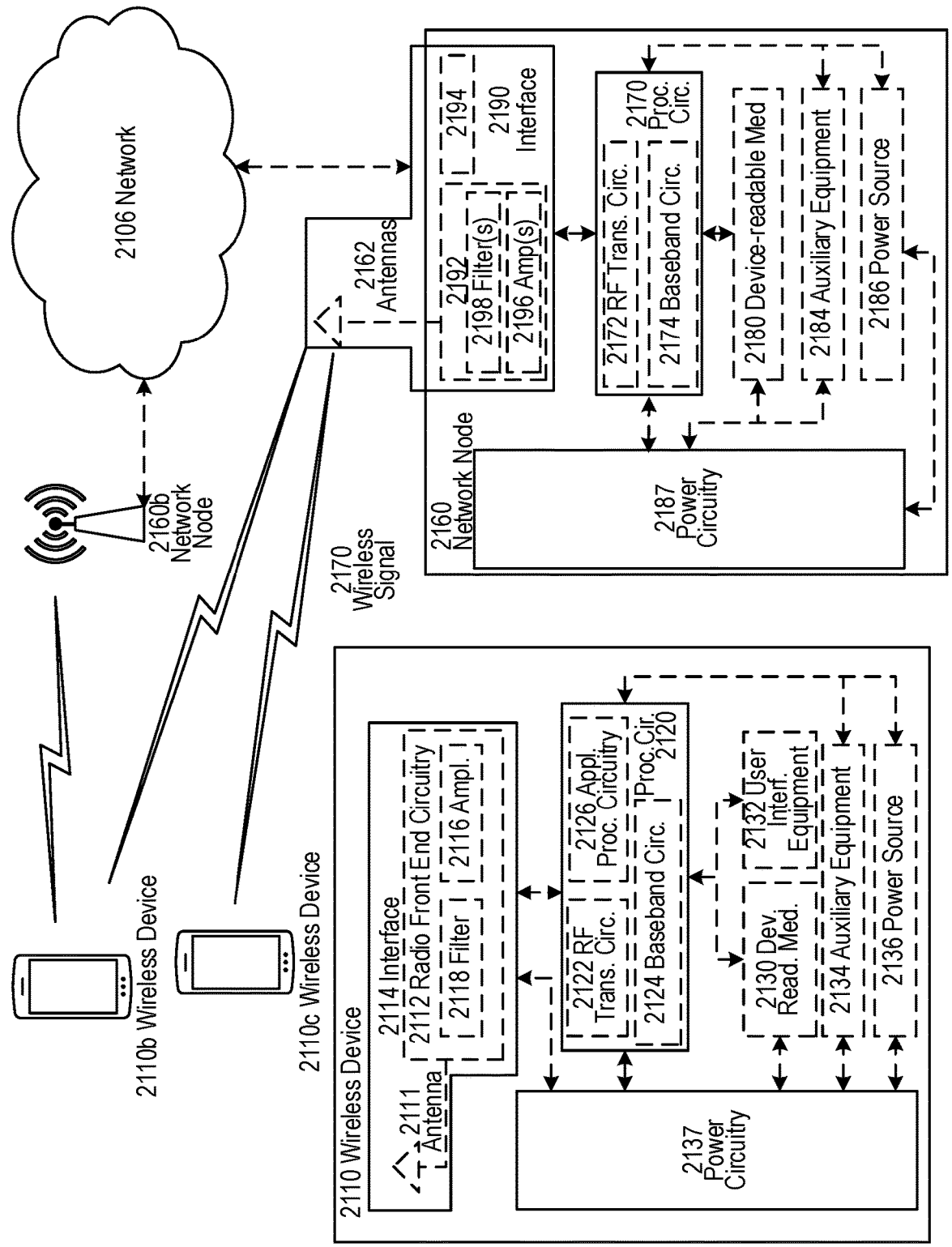
FIG. 21 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 21. For simplicity's sake, the exemplary wireless network shown FIG. 21 only depicts network 2106, network nodes 2160 and 2160*b*, and WDs 2110, 2110*b*, and 2110*c*. In practice, a wireless network can further include any additional elements suitable to support communication between wireless devices or between a wireless device and another communication device, such as a landline telephone, a service provider, or any other network node or end device. Of the illustrated components, network node 2160 and wireless device (WD) 2110 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2106 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2160 and WD 2110 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 21, network node 2160 includes processing circuitry 2170, device readable medium 2180, interface 2190, auxiliary equipment 2184, power source 2186, power circuitry 2187, and antenna 2162. Although network node 2160 illustrated in the example wireless network of FIG. 21 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 2160 are depicted as single boxes located within a larger box, or nested within multiple boxes, in practice, a network node can comprise multiple different physical components that make up a single illustrated component (e.g., device readable medium 2180 can comprise multiple separate hard drives as well as multiple RAM modules).

Similarly, network node 2160 can be composed of multiple physically separate components (e.g., a NodeB component and an RNC component, a BTS component and a BSC component, etc.), which can each have their own respective components. In certain scenarios in which network node 2160 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 2160 can be configured to support multiple radio access technologies (RATs). In such embodiments, some components can be duplicated (e.g., separate device readable medium 2180 for the different RATs) and some components can be reused (e.g., the same antenna 2162 can be shared by the RATs). Network node 2160 can also include multiple sets of the various illustrated components for different wireless technologies integrated into network node 2160, such as, for example, GSM, WCDMA, LTE, NR, WiFi, or Bluetooth wireless technologies. These wireless technologies can be integrated into the same or different chip or set of chips and other components within network node 2160.

Processing circuitry 2170 can be configured to perform any determining, calculating, or similar operations (e.g., certain obtaining operations) described herein as being provided by a network node. These operations performed by processing circuitry 2170 can include processing information obtained by processing circuitry 2170 by, for example, converting the obtained information into other information, comparing the obtained information or converted information to information stored in the network node, and/or performing one or more operations based on the obtained information or converted information, and as a result of said processing making a determination.

Processing circuitry 2170 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 2160, either alone or in conjunction with other network node 2160 components (e.g., device readable medium 2180). Such functionality can include any of the various wireless features, functions, or benefits discussed herein.

For example, processing circuitry 2170 can execute instructions stored in device readable medium 2180 or in memory within processing circuitry 2170. In some embodiments, processing circuitry 2170 can include a system on a chip (SOC). As a more specific example, instructions (also referred to as a computer program product) stored in medium 2180 can include instructions that, when executed by processing circuitry 2170, can configure network node 2160 to perform operations corresponding to various exemplary methods (e.g., procedures) described herein.

In some embodiments, processing circuitry 2170 can include one or more of radio frequency (RF) transceiver circuitry 2172 and baseband processing circuitry 2174. In some embodiments, radio frequency (RF) transceiver circuitry 2172 and baseband processing circuitry 2174 can be on separate chips (or sets of chips), boards, or units, such as radio units and digital units. In alternative embodiments, part or all of RF transceiver circuitry 2172 and baseband processing circuitry 2174 can be on the same chip or set of chips, boards, or units In certain embodiments, some or all of the functionality described herein as being provided by a network node, base station, eNB or other such network device can be performed by processing circuitry 2170 executing instructions stored on device readable medium 2180 or memory within processing circuitry 2170. In alternative embodiments, some or all of the functionality can be provided by processing circuitry 2170 without executing instructions stored on a separate or discrete device readable medium, such as in a hard-wired manner. In any of those embodiments, whether executing instructions stored on a device readable storage medium or not, processing circuitry 2170 can be configured to perform the described functionality. The benefits provided by such functionality are not limited to processing circuitry 2170 alone or to other components of network node 2160 but are enjoyed by network node 2160 as a whole, and/or by end users and the wireless network generally.

Device readable medium 2180 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 2170. Device readable medium 2180 can store any suitable instructions, data or information, including a computer program, software, an application including one or more of logic, rules, code, tables, etc. and/or other instructions capable of being executed by processing circuitry 2170 and, utilized by network node 2160. Device readable medium 2180 can be used to store any calculations made by processing circuitry 2170 and/or any data received via interface 2190. In some embodiments, processing circuitry 2170 and device readable medium 2180 can be considered to be integrated.

Interface 2190 is used in the wired or wireless communication of signaling and/or data between network node 2160, network 2106, and/or WDs 2110. As illustrated, interface 2190 comprises port(s)/terminal(s) 2194 to send and receive data, for example to and from network 2106 over a wired connection. Interface 2190 also includes radio front end circuitry 2192 that can be coupled to, or in certain embodiments a part of, antenna 2162. Radio front end circuitry 2192 comprises filters 2198 and amplifiers 2196. Radio front end circuitry 2192 can be connected to antenna 2162 and processing circuitry 2170. Radio front end circuitry can be configured to condition signals communicated between antenna 2162 and processing circuitry 2170. Radio front end circuitry 2192 can receive digital data that is to be sent out to other network nodes or WDs via a wireless connection. Radio front end circuitry 2192 can convert the digital data into a radio signal having the appropriate channel and bandwidth parameters using a combination of filters 2198 and/or amplifiers 2196. The radio signal can then be transmitted via antenna 2162. Similarly, when receiving data, antenna 2162 can collect radio signals which are then converted into digital data by radio front end circuitry 2192. The digital data can be passed to processing circuitry 2170. In other embodiments, the interface can comprise different components and/or different combinations of components.

In certain alternative embodiments, network node 2160 may not include separate radio front end circuitry 2192, instead, processing circuitry 2170 can comprise radio front end circuitry and can be connected to antenna 2162 without separate radio front end circuitry 2192. Similarly, in some embodiments, all or some of RF transceiver circuitry 2172 can be considered a part of interface 2190. In still other embodiments, interface 2190 can include one or more ports or terminals 2194, radio front end circuitry 2192, and RF transceiver circuitry 2172, as part of a radio unit (not shown), and interface 2190 can communicate with baseband processing circuitry 2174, which is part of a digital unit (not shown).

Antenna 2162 can include one or more antennas, or antenna arrays, configured to send and/or receive wireless signals. Antenna 2162 can be coupled to radio front end circuitry 2190 and can be any type of antenna capable of transmitting and receiving data and/or signals wirelessly. In some embodiments, antenna 2162 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 2162 can be separate from network node 2160 and can be connectable to network node 2160 through an interface or port.

Antenna 2162, interface 2190, and/or processing circuitry 2170 can be configured to perform any receiving operations and/or certain obtaining operations described herein as being performed by a network node. Any information, data and/or signals can be received from a wireless device, another network node and/or any other network equipment. Similarly, antenna 2162, interface 2190, and/or processing circuitry 2170 can be configured to perform any transmitting operations described herein as being performed by a network node. Any information, data and/or signals can be transmitted to a wireless device, another network node and/or any other network equipment.

Power circuitry 2187 can comprise, or be coupled to, power management circuitry and can be configured to supply the components of network node 2160 with power for performing the functionality described herein. Power circuitry 2187 can receive power from power source 2186. Power source 2186 and/or power circuitry 2187 can be configured to provide power to the various components of network node 2160 in a form suitable for the respective components (e.g., at a voltage and current level needed for each respective component). Power source 2186 can either be included in, or external to, power circuitry 2187 and/or network node 2160. For example, network node 2160 can be connectable to an external power source (e.g., an electricity outlet) via an input circuitry or interface such as an electrical cable, whereby the external power source supplies power to power circuitry 2187. As a further example, power source 2186 can comprise a source of power in the form of a battery or battery pack which is connected to, or integrated in, power circuitry 2187. The battery can provide backup power should the external power source fail. Other types of power sources, such as photovoltaic devices, can also be used.

Alternative embodiments of network node 2160 can include additional components beyond those shown in FIG. 21 that can be responsible for providing certain aspects of the network node's functionality, including any of the functionality described herein and/or any functionality necessary to support the subject matter described herein. For example, network node 2160 can include user interface equipment to allow and/or facilitate input of information into network node 2160 and to allow and/or facilitate output of information from network node 2160. This can allow and/or facilitate a user (e.g., an authorized employee, agent, etc. of a network operator or an equipment manufacturer) to perform diagnostic, maintenance, repair, and other administrative functions for network node 2160.

In some embodiments, a wireless device (WD, e.g., WD 2110) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 2110 includes antenna 2111, interface 2114, processing circuitry 2120, device readable medium 2130, user interface equipment 2132, auxiliary equipment 2134, power source 2136 and power circuitry 2137. WD 2110 can include multiple sets of one or more of the illustrated components for different wireless technologies supported by WD 2110, such as, for example, GSM, WCDMA, LTE, NR, WiFi, WiMAX, or Bluetooth wireless technologies, just to mention a few. These wireless technologies can be integrated into the same or different chips or set of chips as other components within WD 2110.

Antenna 2111 can include one or more antennas or antenna arrays, configured to send and/or receive wireless signals, and is connected to interface 2114. In certain alternative embodiments, antenna 2111 can be separate from WD 2110 and be connectable to WD 2110 through an interface or port. Antenna 2111, interface 2114, and/or processing circuitry 2120 can be configured to perform any receiving or transmitting operations described herein as being performed by a WD. Any information, data and/or signals can be received from a network node and/or another WD. In some embodiments, radio front end circuitry and/or antenna 2111 can be considered an interface.

As illustrated, interface 2114 comprises radio front end circuitry 2112 and antenna 2111. Radio front end circuitry 2112 comprise one or more filters 2118 and amplifiers 2116. Radio front end circuitry 2114 is connected to antenna 2111 and processing circuitry 2120 and can be configured to condition signals communicated between antenna 2111 and processing circuitry 2120. Radio front end circuitry 2112 can be coupled to or a part of antenna 2111. In some embodiments, WD 2110 may not include separate radio front end circuitry 2112; rather, processing circuitry 2120 can comprise radio front end circuitry and can be connected to antenna 2111. Similarly, in some embodiments, some or all of RF transceiver circuitry 2122 can be considered a part of interface 2114. Radio front end circuitry 2112 can receive digital data that is to be sent out to other network nodes or WDs via a wireless connection. Radio front end circuitry 2112 can convert the digital data into a radio signal having the appropriate channel and bandwidth parameters using a combination of filters 2118 and/or amplifiers 2116. The radio signal can then be transmitted via antenna 2111. Similarly, when receiving data, antenna 2111 can collect radio signals which are then converted into digital data by radio front end circuitry 2112. The digital data can be passed to processing circuitry 2120. In other embodiments, the interface can comprise different components and/or different combinations of components.

Processing circuitry 2120 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 2110 functionality either alone or in combination with other WD 2110 components, such as device readable medium 2130. Such functionality can include any of the various wireless features or benefits discussed herein.

For example, processing circuitry 2120 can execute instructions stored in device readable medium 2130 or in memory within processing circuitry 2120 to provide the functionality disclosed herein. More specifically, instructions (also referred to as a computer program product) stored in medium 2130 can include instructions that, when executed by processor 2120, can configure wireless device 2110 to perform operations corresponding to various exemplary methods (e.g., procedures) described herein.

As illustrated, processing circuitry 2120 includes one or more of RF transceiver circuitry 2122, baseband processing circuitry 2124, and application processing circuitry 2126. In other embodiments, the processing circuitry can comprise different components and/or different combinations of components. In certain embodiments processing circuitry 2120 of WD 2110 can comprise a SOC. In some embodiments, RF transceiver circuitry 2122, baseband processing circuitry 2124, and application processing circuitry 2126 can be on separate chips or sets of chips. In alternative embodiments, part or all of baseband processing circuitry 2124 and application processing circuitry 2126 can be combined into one chip or set of chips, and RF transceiver circuitry 2122 can be on a separate chip or set of chips. In still alternative embodiments, part or all of RF transceiver circuitry 2122 and baseband processing circuitry 2124 can be on the same chip or set of chips, and application processing circuitry 2126 can be on a separate chip or set of chips. In yet other alternative embodiments, part or all of RF transceiver circuitry 2122, baseband processing circuitry 2124, and application processing circuitry 2126 can be combined in the same chip or set of chips. In some embodiments, RF transceiver circuitry 2122 can be a part of interface 2114. RF transceiver circuitry 2122 can condition RF signals for processing circuitry 2120.

In certain embodiments, some or all of the functionality described herein as being performed by a WD can be provided by processing circuitry 2120 executing instructions stored on device readable medium 2130, which in certain embodiments can be a computer-readable storage medium. In alternative embodiments, some or all of the functionality can be provided by processing circuitry 2120 without executing instructions stored on a separate or discrete device readable storage medium, such as in a hard-wired manner. In any of those particular embodiments, whether executing instructions stored on a device readable storage medium or not, processing circuitry 2120 can be configured to perform the described functionality. The benefits provided by such functionality are not limited to processing circuitry 2120 alone or to other components of WD 2110, but are enjoyed by WD 2110 as a whole, and/or by end users and the wireless network generally.

Processing circuitry 2120 can be configured to perform any determining, calculating, or similar operations (e.g., certain obtaining operations) described herein as being performed by a WD. These operations, as performed by processing circuitry 2120, can include processing information obtained by processing circuitry 2120 by, for example, converting the obtained information into other information, comparing the obtained information or converted information to information stored by WD 2110, and/or performing one or more operations based on the obtained information or converted information, and as a result of said processing making a determination.

Device readable medium 2130 can be operable to store a computer program, software, an application including one or more of logic, rules, code, tables, etc. and/or other instructions capable of being executed by processing circuitry 2120. Device readable medium 2130 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 2120. In some embodiments, processing circuitry 2120 and device readable medium 2130 can be considered to be integrated.

User interface equipment 2132 can include components that allow and/or facilitate a human user to interact with WD 2110. Such interaction can be of many forms, such as visual, audial, tactile, etc. User interface equipment 2132 can be operable to produce output to the user and to allow and/or facilitate the user to provide input to WD 2110. The type of interaction can vary depending on the type of user interface equipment 2132 installed in WD 2110. For example, if WD 2110 is a smart phone, the interaction can be via a touch screen; if WD 2110 is a smart meter, the interaction can be through a screen that provides usage (e.g., the number of gallons used) or a speaker that provides an audible alert (e.g., if smoke is detected). User interface equipment 2132 can include input interfaces, devices and circuits, and output interfaces, devices and circuits. User interface equipment 2132 can be configured to allow and/or facilitate input of information into WD 2110 and is connected to processing circuitry 2120 to allow and/or facilitate processing circuitry 2120 to process the input information. User interface equipment 2132 can include, for example, a microphone, a proximity or other sensor, keys/buttons, a touch display, one or more cameras, a USB port, or other input circuitry. User interface equipment 2132 is also configured to allow and/or facilitate output of information from WD 2110, and to allow and/or facilitate processing circuitry 2120 to output information from WD 2110. User interface equipment 2132 can include, for example, a speaker, a display, vibrating circuitry, a USB port, a headphone interface, or other output circuitry. Using one or more input and output interfaces, devices, and circuits, of user interface equipment 2132, WD 2110 can communicate with end users and/or the wireless network and allow and/or facilitate them to benefit from the functionality described herein.

Auxiliary equipment 2134 is operable to provide more specific functionality which may not be generally performed by WDs. This can comprise specialized sensors for doing measurements for various purposes, interfaces for additional types of communication such as wired communications etc. The inclusion and type of components of auxiliary equipment 2134 can vary depending on the embodiment and/or scenario.

Power source 2136 can, in some embodiments, be in the form of a battery or battery pack. Other types of power sources, such as an external power source (e.g., an electricity outlet), photovoltaic devices or power cells, can also be used. WD 2110 can further comprise power circuitry 2137 for delivering power from power source 2136 to the various parts of WD 2110 which need power from power source 2136 to carry out any functionality described or indicated herein. Power circuitry 2137 can in certain embodiments comprise power management circuitry. Power circuitry 2137 can additionally or alternatively be operable to receive power from an external power source; in which case WD 2110 can be connectable to the external power source (such as an electricity outlet) via input circuitry or an interface such as an electrical power cable. Power circuitry 2137 can also in certain embodiments be operable to deliver power from an external power source to power source 2136. This can be, for example, for the charging of power source 2136. Power circuitry 2137 can perform any converting or other modification to the power from power source 2136 to make it suitable for supply to the respective components of WD 2110.

Figure 22:
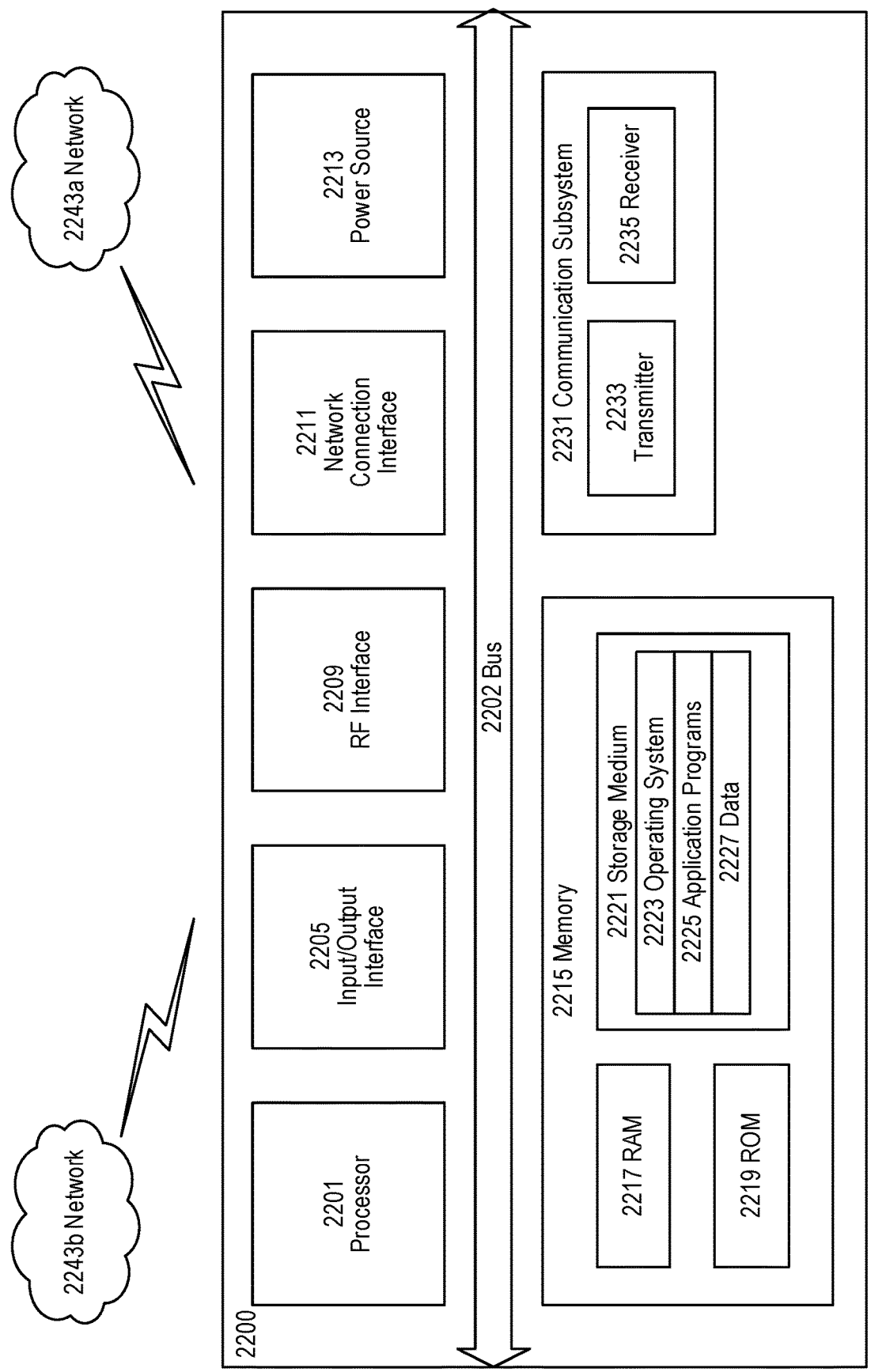
FIG. 22 illustrates an exemplary embodiment of a UE, in accordance with various aspects described herein.

FIG. 22 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 2200 can be any UE identified by the $3^{rd}$ Generation Partnership Project (3GPP), including a NB-IoT UE, a machine type communication (MTC) UE, and/or an enhanced MTC (eMTC) UE. UE 2200, as illustrated in FIG. 22, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 22 is a UE, the components discussed herein are equally applicable to a WD, and vice-versa.

In FIG. 22, UE 2200 includes processing circuitry 2201 that is operatively coupled to input/output interface 2205, radio frequency (RF) interface 2209, network connection interface 2211, memory 2215 including random access memory (RAM) 2217, read-only memory (ROM) 2219, and storage medium 2221 or the like, communication subsystem 2231, power source 2233, and/or any other component, or any combination thereof. Storage medium 2221 includes operating system 2223, application program 2225, and data 2227. In other embodiments, storage medium 2221 can include other similar types of information. Certain UEs can utilize all of the components shown in FIG. 22, or only a subset of the components. The level of integration between the components can vary from one UE to another UE. Further, certain UEs can contain multiple instances of a component, such as multiple processors, memories, transceivers, transmitters, receivers, etc.

In FIG. 22, processing circuitry 2201 can be configured to process computer instructions and data. Processing circuitry 2201 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2201 can include two central processing units (CPUs). Data can be information in a form suitable for use by a computer.

In the depicted embodiment, input/output interface 2205 can be configured to provide a communication interface to an input device, output device, or input and output device. UE 2200 can be configured to use an output device via input/output interface 2205. An output device can use the same type of interface port as an input device. For example, a USB port can be used to provide input to and output from UE 2200. The output device can be a speaker, a sound card, a video card, a display, a monitor, a printer, an actuator, an emitter, a smartcard, another output device, or any combination thereof. UE 2200 can be configured to use an input device via input/output interface 2205 to allow and/or facilitate a user to capture information into UE 2200. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 22, RF interface 2209 can be configured to provide a communication interface to RF components such as a transmitter, a receiver, and an antenna. Network connection interface 2211 can be configured to provide a communication interface to network 2243a. Network 2243a can encompass wired and/or wireless networks such as a local-area network (LAN), a wide-area network (WAN), a computer network, a wireless network, a telecommunications network, another like network or any combination thereof. For example, network 2243a can comprise a Wi-Fi network. Network connection interface 2211 can be configured to include a receiver and a transmitter interface used to communicate with one or more other devices over a communication network according to one or more communication protocols, such as Ethernet, TCP/IP, SONET, ATM, or the like. Network connection interface 2211 can implement receiver and transmitter functionality appropriate to the communication network links (e.g., optical, electrical, and the like). The transmitter and receiver functions can share circuit components, software or firmware, or alternatively can be implemented separately.

RAM 2217 can be configured to interface via bus 2202 to processing circuitry 2201 to provide storage or caching of data or computer instructions during the execution of software programs such as the operating system, application programs, and device drivers. ROM 2219 can be configured to provide computer instructions or data to processing circuitry 2201. For example, ROM 2219 can be configured to store invariant low-level system code or data for basic system functions such as basic input and output (I/O), startup, or reception of keystrokes from a keyboard that are stored in a non-volatile memory. Storage medium 2221 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 2221 can be configured to include operating system 2223; application program 2225 such as a web browser application, a widget or gadget engine or another application; and data file 2227. Storage medium 2221 can store, for use by UE 2200, any of a variety of various operating systems or combinations of operating systems. For example, application program 2225 can include executable program instructions (also referred to as a computer program product) that, when executed by processor 2201, can configure UE 2200 to perform operations corresponding to various exemplary methods (e.g., procedures) described herein.

Storage medium 2221 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2221 can allow and/or facilitate UE 2200 to access computer-executable instructions, application programs or the like, stored on transitory or non-transitory memory media, to off-load data, or to upload data. An article of manufacture, such as one utilizing a communication system can be tangibly embodied in storage medium 2221, which can comprise a device readable medium.

In FIG. 22, processing circuitry 2201 can be configured to communicate with network 2243b using communication subsystem 2231. Network 2243a and network 2243b can be the same network or networks or different network or networks. Communication subsystem 2231 can be configured to include one or more transceivers used to communicate with network 2243b. For example, communication subsystem 2231 can be configured to include one or more transceivers used to communicate with one or more remote transceivers of another device capable of wireless communication such as another WD, UE, or base station of a radio access network (RAN) according to one or more communication protocols, such as IEEE 802.22, CDMA, WCDMA, GSM, LTE, UTRAN, WiMax, or the like. Each transceiver can include transmitter 2233 and/or receiver 2235 to implement transmitter or receiver functionality, respectively, appropriate to the RAN links (e.g., frequency allocations and the like). Further, transmitter 2233 and receiver 2235 of each transceiver can share circuit components, software or firmware, or alternatively can be implemented separately.

In the illustrated embodiment, the communication functions of communication subsystem 2231 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 2231 can include cellular communication, Wi-Fi communication, Bluetooth communication, and GPS communication. Network 2243b can encompass wired and/or wireless networks such as a local-area network (LAN), a wide-area network (WAN), a computer network, a wireless network, a telecommunications network, another like network or any combination thereof. For example, network 2243b can be a cellular network, a Wi-Fi network, and/or a near-field network. Power source 2213 can be configured to provide alternating current (AC) or direct current (DC) power to components of UE 2200.

The features, benefits and/or functions described herein can be implemented in one of the components of UE 2200 or partitioned across multiple components of UE 2200. Further, the features, benefits, and/or functions described herein can be implemented in any combination of hardware, software or firmware. In one example, communication subsystem 2231 can be configured to include any of the components described herein. Further, processing circuitry 2201 can be configured to communicate with any of such components over bus 2202. In another example, any of such components can be represented by program instructions stored in memory that when executed by processing circuitry 2201 perform the corresponding functions described herein. In another example, the functionality of any of such components can be partitioned between processing circuitry 2201 and communication subsystem 2231. In another example, the non-computationally intensive functions of any of such components can be implemented in software or firmware and the computationally intensive functions can be implemented in hardware.

Figure 23:
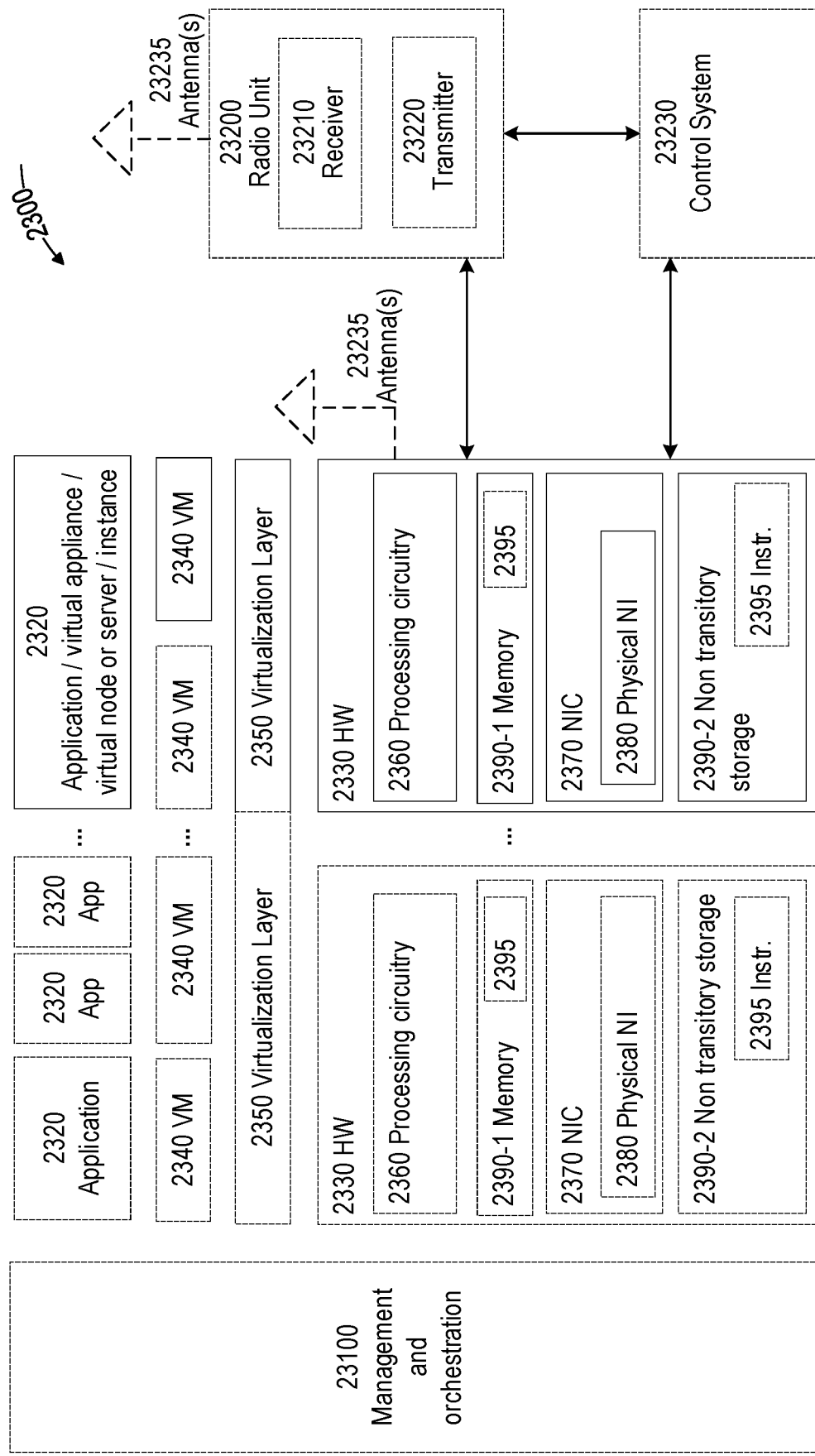
FIG. 23 is a block diagram illustrating an exemplary virtualization environment usable for implementation of various embodiments of network nodes described herein.

FIG. 23 is a schematic block diagram illustrating a virtualization environment 2300 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 2300 hosted by one or more of hardware nodes 2330. Further, in embodiments in which the virtual node is not a radio access node or does not require radio connectivity (e.g., a core network node), then the network node can be entirely virtualized.

The functions can be implemented by one or more applications 2320 (which can alternatively be called software instances, virtual appliances, network functions, virtual nodes, virtual network functions, etc.) operative to implement some of the features, functions, and/or benefits of some of the embodiments disclosed herein. Applications 2320 are run in virtualization environment 2300 which provides hardware 2330 comprising processing circuitry 2360 and memory 2390. Memory 2390 contains instructions 2395 executable by processing circuitry 2360 whereby application 2320 is operative to provide one or more of the features, benefits, and/or functions disclosed herein.

Virtualization environment 2300 can include general-purpose or special-purpose network hardware devices (or nodes) 2330 comprising a set of one or more processors or processing circuitry 2360, which can be commercial off-the-shelf (COTS) processors, dedicated Application Specific Integrated Circuits (ASICs), or any other type of processing circuitry including digital or analog hardware components or special purpose processors. Each hardware device can comprise memory 2390-1 which can be non-persistent memory for temporarily storing instructions 2395 or software executed by processing circuitry 2360. For example, instructions 2395 can include program instructions (also referred to as a computer program product) that, when executed by processing circuitry 2360, can configure hardware node 2320 to perform operations corresponding to various exemplary methods (e.g., procedures) described herein. Such operations can also be attributed to virtual node(s) 2320 that is/are hosted by hardware node 2330.

Each hardware device can comprise one or more network interface controllers (NICs) 2370, also known as network interface cards, which include physical network interface 2380. Each hardware device can also include non-transitory, persistent, machine-readable storage media 2390-2 having stored therein software 2395 and/or instructions executable by processing circuitry 2360. Software 2395 can include any type of software including software for instantiating one or more virtualization layers 2350 (also referred to as hypervisors), software to execute virtual machines 2340 as well as software allowing it to execute functions, features and/or benefits described in relation with some embodiments described herein.

Virtual machines 2340, comprise virtual processing, virtual memory, virtual networking or interface and virtual storage, and can be run by a corresponding virtualization layer 2350 or hypervisor. Different embodiments of the instance of virtual appliance 2320 can be implemented on one or more of virtual machines 2340, and the implementations can be made in different ways.

During operation, processing circuitry 2360 executes software 2395 to instantiate the hypervisor or virtualization layer 2350, which can sometimes be referred to as a virtual machine monitor (VMM). Virtualization layer 2350 can present a virtual operating platform that appears like networking hardware to virtual machine 2340.

As shown in FIG. 23, hardware 2330 can be a standalone network node with generic or specific components. Hardware 2330 can comprise antenna 23225 and can implement some functions via virtualization. Alternatively, hardware 2330 can be part of a larger cluster of hardware (e.g., such as in a data center or customer premise equipment (CPE)) where many hardware nodes work together and are managed via management and orchestration (MANO) 23100, which, among others, oversees lifecycle management of applications 2320.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment. NFV can also be used in connection with cloud-based infrastructure.

In the context of NFV, virtual machine 2340 can be a software implementation of a physical machine that runs programs as if they were executing on a physical, non-virtualized machine. Each of virtual machines 2340, and that part of hardware 2330 that executes that virtual machine, be it hardware dedicated to that virtual machine and/or hardware shared by that virtual machine with others of the virtual machines 2340, forms a separate virtual network elements (VNE).

Still in the context of NFV, Virtual Network Function (VNF) is responsible for handling specific network functions that run in one or more virtual machines 2340 on top of hardware networking infrastructure 2330 and corresponds to application 2320 in FIG. 23.

In some embodiments, one or more radio units 23200 that each include one or more transmitters 23220 and one or more receivers 23210 can be coupled to one or more antennas 23225. Radio units 23200 can communicate directly with hardware nodes 2330 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 23230, which can alternatively be used for communication between the hardware nodes 2330 and radio units 23200.

Figure 24:
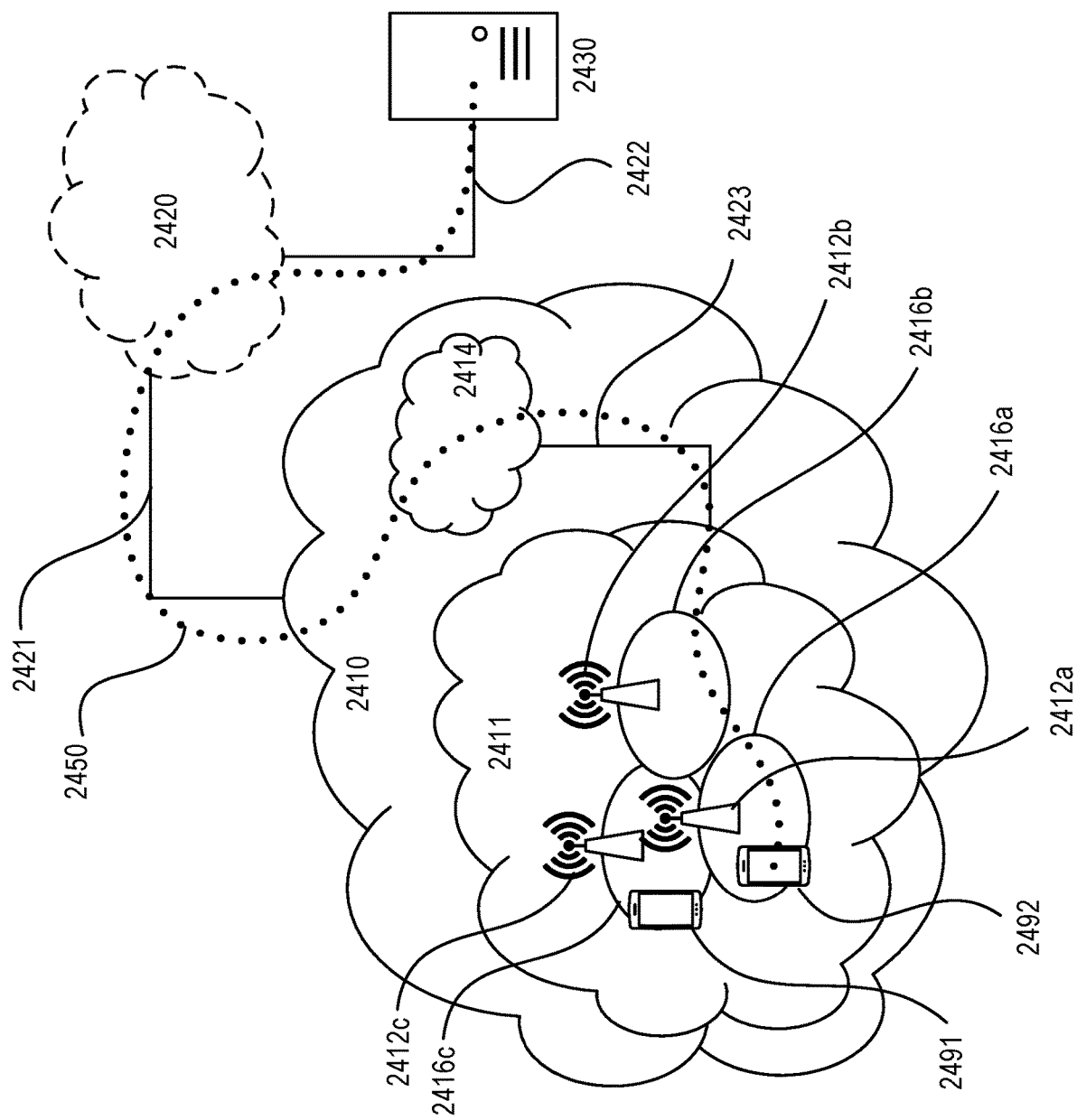
FIGS. 24-25 are block diagrams of various exemplary communication systems and/or networks, in accordance with various aspects described herein.

With reference to FIG. 24, in accordance with an embodiment, a communication system includes telecommunication network 2410, such as a 3GPP-type cellular network, which comprises access network 2411, such as a radio access network, and core network 2414. Access network 2411 comprises a plurality of base stations 2412a, 2412b, 2412c, such as NBs, eNBs, gNBs or other types of wireless access points, each defining a corresponding coverage area 2413a, 2413b, 2413c. Each base station 2412a, 2412b, 2412c is connectable to core network 2414 over a wired or wireless connection 2415. A first UE 2491 located in coverage area 2413c can be configured to wirelessly connect to, or be paged by, the corresponding base station 2412c. A second UE 2492 in coverage area 2413a is wirelessly connectable to the corresponding base station 2412a. While a plurality of UEs 2491, 2492 are illustrated in this example, the disclosed embodiments are equally applicable to a situation where a sole UE is in the coverage area or where a sole UE is connecting to the Telecommunication network 2410 is itself connected to host computer 2430, which can be embodied in the hardware and/or software of a standalone server, a cloud-implemented server, a distributed server or as processing resources in a server farm. Host computer 2430 can be under the ownership or control of a service provider or can be operated by the service provider or on behalf of the service provider. Connections 2421 and 2422 between telecommunication network 2410 and host computer 2430 can extend directly from core network 2414 to host computer 2430 or can go via an optional intermediate network 2420. Intermediate network 2420 can be one of, or a combination of more than one of, a public, private or hosted network; intermediate network 2420, if any, can be a backbone network or the Internet; in particular, intermediate network 2420 can comprise two or more sub-networks (not shown).

The communication system of FIG. 24 as a whole enables connectivity between the connected UEs 2491, 2492 and host computer 2430. The connectivity can be described as an over-the-top (OTT) connection 2450. Host computer 2430 and the connected UEs 2491, 2492 are configured to communicate data and/or signaling via OTT connection 2450, using access network 2411, core network 2414, any intermediate network 2420 and possible further infrastructure (not shown) as intermediaries. OTT connection 2450 can be transparent in the sense that the participating communication devices through which OTT connection 2450 passes are unaware of routing of uplink and downlink communications. For example, base station 2412 may not or need not be informed about the past routing of an incoming downlink communication with data originating from host computer 2430 to be forwarded (e.g., handed over) to a connected UE 2491. Similarly, base station 2412 need not be aware of the future routing of an outgoing uplink communication originating from the UE 2491 towards the host computer 2430.

Example implementations, in accordance with an embodiment, of the UE, base station and host computer discussed in the preceding paragraphs will now be described with reference to FIG. 25. In communication system 2500, host computer 2510 comprises hardware 2515 including communication interface 2516 configured to set up and maintain a wired or wireless connection with an interface of a different communication device of communication system 2500. Host computer 2510 further comprises processing circuitry 2518, which can have storage and/or processing capabilities. In particular, processing circuitry 2518 can comprise one or more programmable processors, application-specific integrated circuits, field programmable gate arrays or combinations of these (not shown) adapted to execute instructions. Host computer 2510 further comprises software 2511, which is stored in or accessible by host computer 2510 and executable by processing circuitry 2518. Software 2511 includes host application 2512. Host application 2512 can be operable to provide a service to a remote user, such as ULE 2530 connecting via OTT connection 2550 terminating at UE 2530 and host computer 2510. In providing the service to the remote user, host application 2512 can provide user data which is transmitted using OTT connection 2550.

Communication system 2500 can also include base station 2520 provided in a telecommunication system and comprising hardware 2525 enabling it to communicate with host computer 2510 and with UE 2530. Hardware 2525 can include communication interface 2526 for setting up and maintaining a wired or wireless connection with an interface of a different communication device of communication system 2500, as well as radio interface 2527 for setting up and maintaining at least wireless connection 2570 with UE 2530 located in a coverage area (not shown in FIG. 25) served by base station 2520. Communication interface 2526 can be configured to facilitate connection 2560 to host computer 2510. Connection 2560 can be direct, or it can pass through a core network (not shown in FIG. 25) of the telecommunication system and/or through one or more intermediate networks outside the telecommunication system. In the embodiment shown, hardware 2525 of base station 2520 can also include processing circuitry 2528, which can comprise one or more programmable processors, application-specific integrated circuits, field programmable gate arrays or combinations of these (not shown) adapted to execute instructions.

Base station 2520 also includes software 2521 stored internally or accessible via an external connection. For example, software 2521 can include program instructions (also referred to as a computer program product) that, when executed by processing circuitry 2528, can configure base station 2520 to perform operations corresponding to various exemplary methods (e.g., procedures) described herein.

Communication system 2500 can also include UE 2530 already referred to, whose hardware 2535 can include radio interface 2537 configured to set up and maintain wireless connection 2570 with a base station serving a coverage area in which UE 2530 is currently located. Hardware 2535 of UE 2530 can also include processing circuitry 2538, which can comprise one or more programmable processors, application-specific integrated circuits, field programmable gate arrays or combinations of these (not shown) adapted to execute instructions.

UE 2530 also includes software 2531, which is stored in or accessible by UE 2530 and executable by processing circuitry 2538. Software 2531 includes client application 2532. Client application 2532 can be operable to provide a service to a human or non-human user via UE 2530, with the support of host computer 2510. In host computer 2510, an executing host application 2512 can communicate with the executing client application 2532 via OTT connection 2550 terminating at UE 2530 and host computer 2510. In providing the service to the user, client application 2532 can receive request data from host application 2512 and provide user data in response to the request data. OTT connection 2550 can transfer both the request data and the user data. Client application 2532 can interact with the user to generate the user data that it provides. Software 2531 can also include program instructions (also referred to as a computer program product) that, when executed by processing circuitry 2538, can configure UE 2530 to perform operations corresponding to various exemplary methods (e.g., procedures) described herein.

Figure 25:
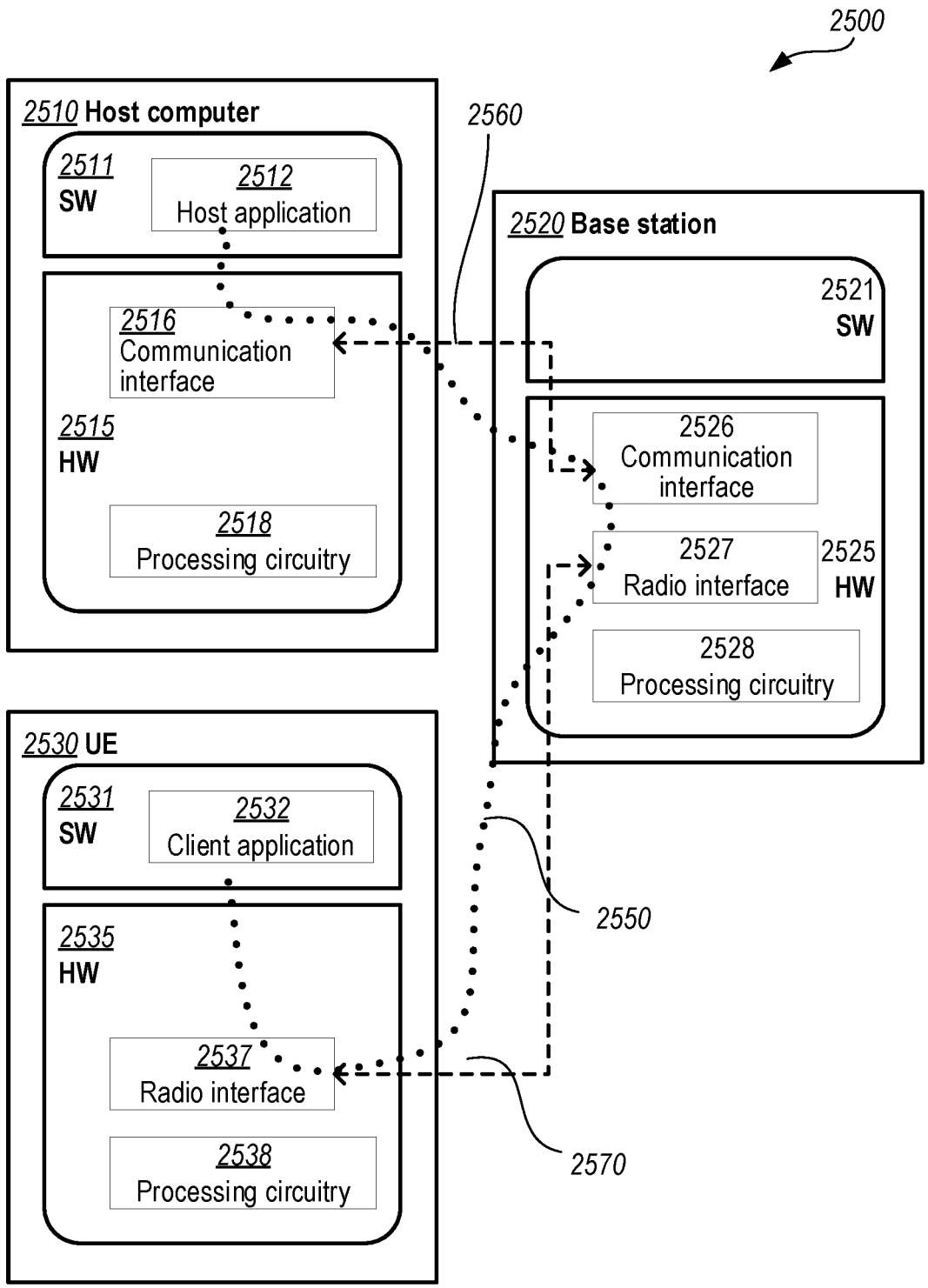

It is noted that host computer 2510, base station 2520 and UE 2530 illustrated in FIG. 25 can be similar or identical to host computer 1230, one of base stations 2512a, 2512b, 2512c and one of UEs 2591, 2592 of FIG. 25, respectively. This is to say, the inner workings of these entities can be as shown in FIG. 25 and independently, the surrounding network topology can be that of FIG. 25.

In FIG. 25, OTT connection 2550 has been drawn abstractly to illustrate the communication between host computer 2510 and UE 2530 via base station 2520, without explicit reference to any intermediary devices and the precise routing of messages via these devices. Network infrastructure can determine the routing, which it can be configured to hide from UE 2530 or from the service provider operating host computer 2510, or both. While OTT connection 2550 is active, the network infrastructure can further take decisions by which it dynamically changes the routing (e.g., on the basis of load balancing consideration or reconfiguration of the network).

Wireless connection 2570 between UE 2530 and base station 2520 is in accordance with the teachings of the embodiments described throughout this disclosure. One or more of the various embodiments improve the performance of OTT services provided to UE 2530 using OTT connection 2550, in which wireless connection 2570 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2550 between host computer 2510 and UE 2530, in response to variations in the measurement results. The measurement procedure and/or the network functionality for reconfiguring OTT connection 2550 can be implemented in software 2511 and hardware 2515 of host computer 2510 or in software 2531 and hardware 2535 of UE 2530, or both. In embodiments, sensors (not shown) can be deployed in or in association with communication devices through which OTT connection 2550 passes; the sensors can participate in the measurement procedure by supplying values of the monitored quantities exemplified above, or supplying values of other physical quantities from which software 2511, 2531 can compute or estimate the monitored quantities. The reconfiguring of OTT connection 2550 can include message format, retransmission settings, preferred routing etc.; the reconfiguring need not affect base station 2520, and it can be unknown or imperceptible to base station 2520. Such procedures and functionalities can be known and practiced in the art. In certain embodiments, measurements can involve proprietary UE signaling facilitating host computer 2510's measurements of throughput, propagation times, latency and the like. The measurements can be implemented in that software 2511 and 2531 causes messages to be transmitted, in particular empty or 'dummy' messages, using OTT connection 2550 while it monitors propagation times, errors, etc.

FIG. 26 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 26 will be included in this section. In step 2610, the host computer provides user data. In substep 2611 (which can be optional) of step 2610, the host computer provides the user data by executing a host application. In step 2620, the host computer initiates a transmission carrying the user data to the UE. In step 2630 (which can be optional), the base station transmits to the UE the user data which was carried in the transmission that the host computer initiated, in accordance with the teachings of the embodiments described throughout this disclosure. In step 2640 (which can also be optional), the UE executes a client application associated with the host application executed by the host computer.

FIG. 27 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 27 will be included in this section. In step 2710 of the method, the host computer provides user data. In an optional substep (not shown) the host computer provides the user data by executing a host application. In step 2720, the host computer initiates a transmission carrying the user data to the UE. The transmission can pass via the base station, in accordance with the teachings of the embodiments described throughout this disclosure. In step 2730 (which can be optional), the UE receives the user data carried in the transmission.

FIG. 28 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 28 will be included in this section. In step 2810 (which can be optional), the UE receives input data provided by the host computer. Additionally or alternatively, in step 2820, the UE provides user data. In substep 2821 (which can be optional) of step 2820, the UE provides the user data by executing a client application. In substep 2811 (which can be optional) of step 2810, the UE executes a client application which provides the user data in reaction to the received input data provided by the host computer. In providing the user data, the executed client application can further consider user input received from the user. Regardless of the specific manner in which the user data was provided, the UE initiates, in substep 2830 (which can be optional), transmission of the user data to the host computer. In step 2840 of the method, the host computer receives the user data transmitted from the UE, in accordance with the teachings of the embodiments described throughout this disclosure.

FIG. 29 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 29 will be included in this section. In step 2910 (which can be optional), in accordance with the teachings of the embodiments described throughout this disclosure, the base station receives user data from the UE. In step 2920 (which can be optional), the base station initiates transmission of the received user data to the host computer. In step 2930 (which can be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software.

In addition, a device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. As such, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

The invention claimed is:

1. A computer-implemented method performed by a performance recommender system for a wireless network, the method comprising:
   for each of a plurality of cells in the wireless network, obtaining input data comprising actual values for one or more cell configuration parameters;
   applying a machine-learning model to the input data to generate, for at least a portion of the cells, one or more recommendations for changes to the cell configuration parameter values to improve uplink (UL) performance in the respective cells;
   based on identifying conflicts between recommendations for different cells, partitioning the plurality of cells into a plurality of interaction areas of neighboring cells;
   resolving conflicts in recommendations for respective cells within each of the interaction areas and across different interaction areas; and
   for at least a portion of the cells, determining preferred values for the cell configuration parameters to improve UL performance in the respective cells.

2. The method of claim 1, wherein the input data further comprises at least one of the following:
   time-series data representing a plurality of key performance indicators (KPIs) at a plurality of time points, and
   a root cause identity of a performance issue associated with the cell.

3. The method of claim 1, wherein identifying conflicts between recommendations comprises:
   identifying a first recommendation comprising changed values of the cell configuration parameters for a first cell and current values of the cell configuration parameters for a neighbor cell to the first cell; and
   identifying a second recommendation comprising changed values of the cell configuration parameters for the neighbor cell and current values of the cell configuration parameters for the first cell.

4. The method of claim 3, wherein partitioning the plurality of cells comprises grouping the first cell and the neighbor cell into a first interaction area.

5. The method of claim 1, wherein resolving conflicts comprises:
   determining which of the first and second recommendations will provide greatest expected UL performance improvement for the first cell and the neighbor cell; and
   selecting the determined recommendation as the recommendation for the first interaction area.

6. The method of claim 5, wherein
   the first interaction area overlaps with a second interaction area by one or more common cells;
   for at least one of the common cells, the recommendation for the second interaction area conflicts with the recommendation for the first interaction area; and
   resolving conflicts further comprises:
      determining which of the recommendations for the first and second interaction areas will provide greatest expected UL performance improvement for the first and second interaction areas; and
      selecting the determined recommendation as the recommendation for the first and second interaction areas.

7. The method of claim 1, further comprising, for each particular cell of the plurality, associating the input data for the particular cell with the input data for one or more neighbor cells that interact with the particular cell.

8. The method of claim 7, wherein the one or more neighbor cells that interact with the particular cell are selected based on input data relating to handover attempts between the respective cells.

9. The method of claim 7, wherein applying the machine-learning model comprises:
   for each particular cell, performing a random sampling of the configuration parameters for the particular cell and the one or more neighbor cells, to produce a more uniform distribution of the values of the configuration parameters; and
   creating the machine-learning model based on the more uniform distribution of values of the configuration parameters for the plurality of cells.

10. The method of claim 1, wherein applying the machine-learning model comprises
    generating candidate recommendations for changes to cell configuration parameters for the plurality of cells; and
    selecting, as the one or more recommendations for the at least a portion of the cells, the candidate recommendations that are associated with UL performance improvements greater than a threshold.

11. The method of claim 1, wherein the machine-learning model comprises a deep matrix factorization model.

12. The method of claim 1, wherein the cell configuration parameters include any of the following:
    a target UL received power level on PUSCH (pZeroNominalPUSCH); and
    a fractional power control setting (alpha).

13. The method of claim 1, wherein the plurality of KPIs for the cells include at least two of the following:
    average number of active downlink (DL) users per transmission time interval (TTI);
    average number of active UL users per TTI;
    average number of DL scheduling entities per TTI;
    average number of UL scheduling entities per TTI;
    RRC connection attempts;
    average number of RRC_CONNECTED users;
    maximum number of RRC_CONNECTED users;
    data volume for DL data radio bearer (DRB) traffic;
    data volume for UL DRB traffic;
    data volume for DL signaling radio bearer (SRB) traffic;
    data volume for UL SRB traffic;
    average DL physical resource block (PRB) utilization;
    average UL PRB utilization;
    average PDCCH control channel element (CCE) load;
    average channel quality indicator (CQI) reported;
    portion of reported CQI below threshold;
    average user DL throughput;
    average user UL throughput;
    user equipment (UE) random access attempts on RACH;
    UE random access attempt success ratio;
    average DL hybrid ARQ (HARQ) discontinuous transmission (DTX) ratio;
    average UL HARQ DTX ratio;
    portion of PUSCH SINR<−2 dB;
    portion of PUCCH SINR<0 dB;
    average PUSCH SINR;
    average PUCCH SINR;
    average PUSCH interference level;
    average PUCCH interference level;
    average UL pathloss;
    portion of UL pathloss above 130 dB;
    portion of UE UL transmit power limited;
    average processor load; and
    portion of processor load>80% of capacity.

14. A performance recommender system for a wireless network, the performance recommender system being implemented by processing circuitry and communication interface circuitry arranged as:
    a recommender module configured to:
       for each of a plurality of cells in the wireless network, obtain input data comprising actual values for one or more cell configuration parameters; and
       apply a machine-learning model to the input data to obtain, for at least a portion of the cells, one or more recommendations for changes to the cell configuration parameter values to improve uplink (UL) performance in the respective cells; and
    a network design and optimization (NDO) module configured to:
       based on identified conflicts between recommendations for different cells, partition the plurality of cells into a plurality of interaction areas of neighboring cells;
       resolve conflicts in recommendations for respective cells within each of the interaction areas and across different interaction areas; and
       for at least a portion of the cells, determine preferred values for the cell configuration parameters to improve the UL performance in the respective cells.

15. The performance recommender system of claim 14, wherein the input data further includes at least one of the following:
    time-series data representing a plurality of key performance indicators (KPIs) at a plurality of time points; and
    a root cause identity of a performance issue associated with the cell.

16. The performance recommender system of claim 14, wherein the NDO module is configured to identify conflicts between recommendations based on:
    identifying a first recommendation comprising changed values of the cell configuration parameters for a first cell and current values of the cell configuration parameters for a neighbor cell to the first cell; and identifying a second recommendation comprising changed values of the cell configuration parameters for the neighbor cell and current values of the cell configuration parameters for the first cell.

17. The performance recommender system of claim 14, wherein the NDO module is configured to resolve conflicts based on:

determining which of the first and second recommendations will provide the greatest expected UL performance improvement for the first cell and the neighbor cell; and selecting the determined recommendation as the recommendation for the first interaction area.

18. The performance recommender system of claim 17, wherein the first interaction area overlaps with a second interaction area by one or more common cells;

for at least one of the common cells, the recommendation for the second interaction area conflicts with the recommendation for the first interaction area; and the NDO module is configured to resolve conflicts further based on:

determining which of the recommendations for the first and second interaction areas will provide the greatest expected UL performance improvement for the first and second interaction areas; and selecting the determined recommendation as the recommendation for the first and second interaction areas.

19. The performance recommender system of claim 14, wherein:

the processing circuitry and the communication interface circuitry are part of one or more processing nodes in the wireless network or in a cloud-computing infrastructure coupled to the wireless network; and the performance recommender system is implemented as a virtualized network function hosted by the one or more processing nodes.

20. A non-transitory, computer-readable medium storing computer-executable instructions that, when executed by processing circuitry associated with a performance recommender system for a wireless network, configure the performance recommender system to perform operations corresponding to the method of claim 1.

* * * * *